US012279089B2

(12) United States Patent
Corynen

(10) Patent No.: US 12,279,089 B2
(45) Date of Patent: *Apr. 15, 2025

(54) DIPOLE LOUDSPEAKER FOR PRODUCING SOUND AT BASS FREQUENCIES

(71) Applicant: PSS BELGIUM NV, Dendermonde (BE)

(72) Inventor: David Corynen, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,373

(22) Filed: Nov. 3, 2023

(65) Prior Publication Data

US 2024/0073592 A1 Feb. 29, 2024

Related U.S. Application Data

(63) Continuation of application No. 17/708,383, filed on Mar. 30, 2022, now Pat. No. 11,838,721, which is a (Continued)

(30) Foreign Application Priority Data

Dec. 18, 2017 (GB) ...................................... 1721127
Apr. 4, 2018 (GB) ...................................... 1805525

(51) Int. Cl.
*H04R 1/32* (2006.01)
*H04R 1/40* (2006.01)
(Continued)

(52) U.S. Cl.
CPC ............. *H04R 1/323* (2013.01); *H04R 1/403* (2013.01); *H04R 5/023* (2013.01); *H04R 7/04* (2013.01); *H04R 2499/13* (2013.01)

(58) Field of Classification Search
CPC .......... H04R 1/323; H04R 1/403; H04R 3/12; H04R 1/24; H04R 1/2857; H04R 7/04;
(Continued)

(56) References Cited

U.S. PATENT DOCUMENTS 3,727,719 A 4/1973 Yando
4,620,605 A 11/1986 Gore et al.
(Continued)

FOREIGN PATENT DOCUMENTS

CN 101682814 A 3/2010
CN 102792712 A 11/2012
(Continued)

OTHER PUBLICATIONS

UKIPO, Search Report for corresponding GB Patent Application No. 1721127.7, dated Jun. 5, 2018, 2 pages.
(Continued)

*Primary Examiner* — Norman Yu
(74) *Attorney, Agent, or Firm* — NK Patent Law

(57) ABSTRACT

A dipole loudspeaker for producing sound at bass frequencies. The dipole loudspeaker includes: a diaphragm having a first radiating surface and a second radiating surface, a drive unit configured to move the diaphragm at bass frequencies such that the first and second radiating surfaces produce sound at bass frequencies, and a frame. The loudspeaker is for use with an ear of a user being located at a listening position that is in front of the first radiating surface and is 40 cm or less from the first radiating surface.

18 Claims, 22 Drawing Sheets

Related U.S. Application Data continuation of application No. 16/954,848, filed as application No. PCT/EP2018/084636 on Dec. 12, 2018, now Pat. No. 11,336,994.

(51) Int. Cl.
*H04R 5/02* (2006.01)
*H04R 7/04* (2006.01)

(58) Field of Classification Search
CPC .. H04R 2499/13; H04R 9/063; H04R 1/2803; H04R 1/2815; H04R 2205/024; H04R 5/023; H04R 1/2811
USPC ......... 381/17, 182, 300, 335, 1, 80, 86, 302, 381/336, 345, 351, 395, 71.7, 3, 89
See application file for complete search history.

(56) References Cited

U.S. PATENT DOCUMENTS

| | | | | |
|---|---|---|---|---|
| 5,136,651 | A | 8/1992 | Cooper et al. | |
| 5,815,579 | A | 9/1998 | Boyden | |
| 5,887,071 | A * | 3/1999 | House | H04R 5/02 381/87 |
| 6,332,029 | B1 | 12/2001 | Azima et al. | |
| 7,062,049 | B1 * | 6/2006 | Inoue | G10K 11/17857 381/86 |
| 7,688,992 | B2 | 3/2010 | Aylward | |
| 7,692,363 | B2 | 4/2010 | Butler | |
| 8,130,987 | B2 | 3/2012 | Kaneda | |
| 8,553,890 | B2 | 10/2013 | Yokota | |
| 9,327,628 | B2 | 5/2016 | Subat | |
| 9,428,090 | B2 | 8/2016 | Subat et al. | |
| 9,440,566 | B2 | 9/2016 | Subat | |
| 11,336,994 | B2 | 5/2022 | Corynen | |
| 2004/0008857 | A1 * | 1/2004 | Marnie | H04R 1/20 381/397 |
| 2006/0269068 | A1 | 11/2006 | Yokota | |
| 2008/0019558 | A1 * | 1/2008 | Simidian, II | H04R 31/006 381/408 |
| 2008/0025534 | A1 | 1/2008 | Kuhn et al. | |
| 2008/0037794 | A1 * | 2/2008 | Sugawara | H04R 5/023 381/1 |
| 2008/0292121 | A1 | 11/2008 | Yokota | |
| 2011/0235832 | A1 * | 9/2011 | Riopel | A47G 9/1045 381/300 |
| 2011/0286614 | A1 | 11/2011 | Hess | |
| 2013/0195311 | A1 * | 8/2013 | Sahyoun | H04R 1/2834 381/398 |
| 2016/0027428 | A1 | 1/2016 | Gul et al. | |
| 2018/0054670 | A1 * | 2/2018 | Struzik | H04R 1/2857 |
| 2019/0304431 | A1 * | 10/2019 | Cardinaux | H04R 1/406 |

FOREIGN PATENT DOCUMENTS

| | | | |
|---|---|---|---|
| CN | 107211216 | A | 9/2017 |
| DE | 102014210105 | A1 | 12/2015 |
| EP | 0988771 | A1 | 3/2000 |
| EP | 1460879 | A2 | 9/2004 |
| EP | 1763281 | A2 | 3/2007 |
| JP | 2008188099 | A | 8/2008 |
| WO | 9806232 | A1 | 2/1998 |
| WO | 2009012499 | A1 | 1/2009 |
| WO | 2009120467 | A1 | 10/2009 |
| WO | 2012051217 | A2 | 4/2012 |
| WO | 2014143927 | A2 | 9/2014 |

OTHER PUBLICATIONS

ISA/EP, International Search Report and Written Opinion for corresponding International Patent Application No. PCT/EP2018/084636, mailed Feb. 22, 2019, 12 pages.
Wikipedia: "Equal-loudness contour", https://en.wikipedia.org/wiki/Equal-loudness_contour, accessed on May 12, 2017, 6 pages.
Linkwitz Lab—Loudspeaker Design: "Simply Music—Linkwitz Lab transducers bring the musicians to your home", http://www.linkwitzlab.com, accessed on May 12, 2017, 16 pages.
Linkwitz Lab—Electro-acoustic models: "Models for a dipole loudspeaker design", http://www.linkwitzlab.com/models.htm, accessed on May 12, 2017, 13 pages.
Mellow, Tim et al.: "On the sound field of an oscillating disk in a finite open and closed circular baffle", J. Acoust. Soc. Am 118 (3), Pt. 1, Sep. 2005, p. 1311-1325, 15 pages.
Techopedia: "Head Tracking", https://www.techopedia.com/definition/31557/head-tracking, 1 page.
Siu, Jason: "Two Companies are Working on Bringing In-Car Sensing Tech to New Cars", AutoGuide.com, Aug. 14, 2017, http://www.autoguide.com/auto-news/2017/08/two-companies-are-working-on-bringing-in-car-sensing-tech-to-new-cars.html, 4 pages.
Sharpbrains: "General Motors to adopt eye, head-tracking technology to reduce distracted driving", Sep. 2, 2014, https://sharpbrains.com/blog/2014/09/02/general-motors-to-adopt-eye-head-tracking-technology-to-reduce-distracted-driving/, 2 pages.
Purcher, Jack: "Apple Wins Patent for Advanced 3D Eye/Head Tracking System Supporting Apple's 3D Camera", Patently Apple, Aug. 23, 2016, http://www.patentlyapple.com/patently-apple/2016/08/apple-wins-patent-for-advanced-3d-eyehead-tracking-system-supporting-apples-3d-camera.html, 6 pages.
Ivantysynova, Lenka et al.: "Face Recognition and Head Tracking in Embedded Systems", Optik&Photonik, Jan. 2015, pp. 42-45, 4 pages.
CNIPA, First Office Action for corresponding Chinese Patent Application No. 201880082107.1, dated May 28, 2021, 10 pages.
USPTO, Non-final Office Action for corresponding U.S. Appl. No. 16/954,848, mailed May 19, 2021, 17 pages.
USPTO, Final Office Action for corresponding U.S. Appl. No. 16/954,848, mailed Sep. 24, 2021, 19 pages.
USPTO, Non-final Office Action for corresponding U.S. Appl. No. 17/708,383, mailed Feb. 23, 2023, 22 pages.
CNIPA, The First Office Action for corresponding Chinese Patent Application No. 2022107821634, dated Jul. 10, 2024, 8 pages.

* cited by examiner

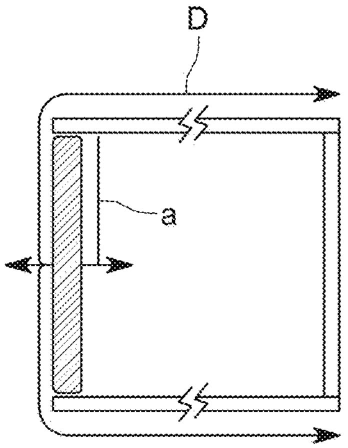
FIG. 1A
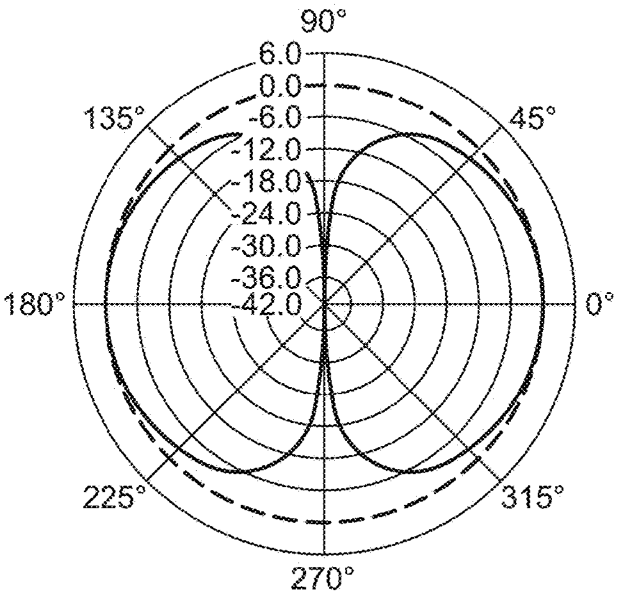
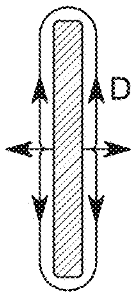
FIG. 1C
FIG. 1B
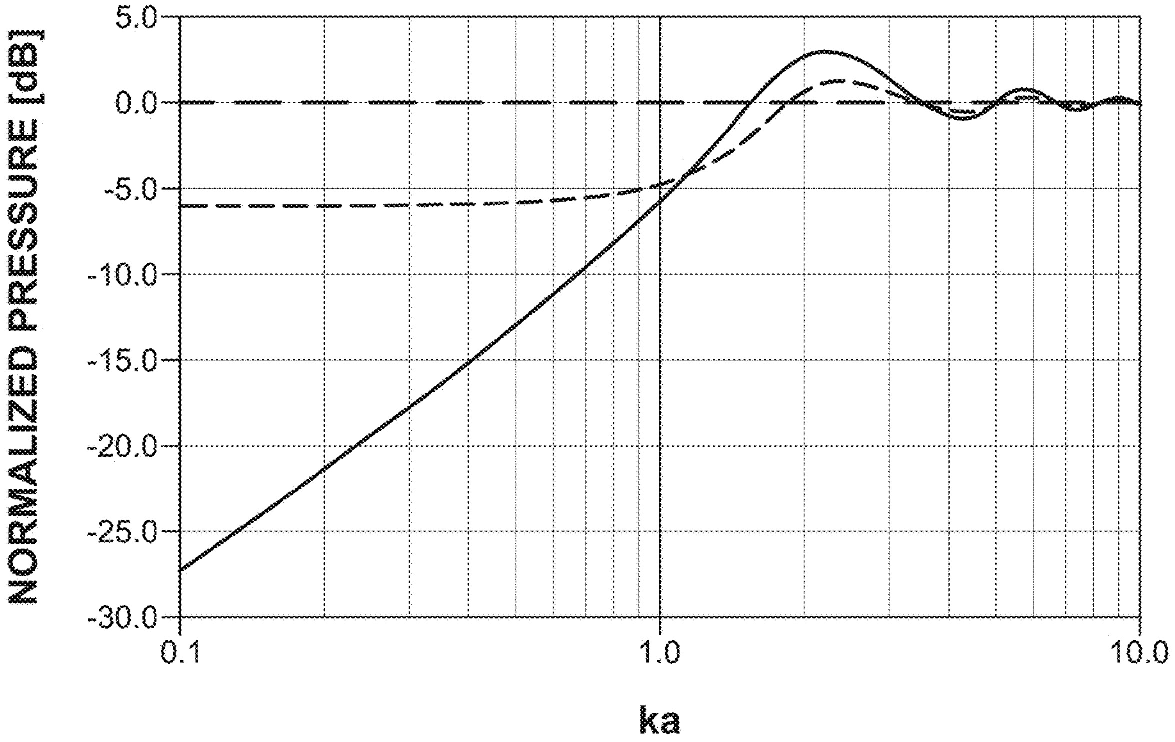
FIG. 2

(a)

(b)

DIPOLE LOUDSPEAKER FOR PRODUCING SOUND AT BASS FREQUENCIES

CROSS REFERENCE TO RELATED APPLICATIONS

This application is a continuation of U.S. patent application Ser. No. 17/708,383 filed Mar. 30, 2022, which is a continuation of U.S. patent application Ser. No. 16/954,848 filed Jun. 17, 2020, now U.S. Pat. No. 11,336,994 issued on May 17, 2022, which is a U.S. National Stage application of International Patent Application No. PCT/EP2018/084636 filed Dec. 12, 2018, which claims priority from GB1721127.7 filed Dec. 18, 2017 and GB1805525.1 filed Apr. 4, 2018, the contents and elements of which are herein incorporated by reference for all purposes.

FIELD OF THE INVENTION

The present invention relates to a dipole loudspeaker for producing sound at bass frequencies.

BACKGROUND

Among the frequencies in the audible spectrum, lower frequencies are the ones that tend to carry most well over larger distances and are the ones difficult to keep inside a room. For example, nuisance from neighboring loud music has mostly a low frequency spectrum. "Low" frequencies can also be referred to as "bass" frequencies and these terms may be used interchangeably throughout this document.

Many cars today are equipped with a main audio system, which typically consist of a central user interface console with internal or external audio amplifiers, and one or more loudspeakers placed in the doors. This type of audio systems is used to ensure enough loudness of the same content (e.g. radio or cd-playback) for all passengers.

Some cars include personal entertainment systems (music, games & television) which are typically equipped with headphones to ensure individual passengers receive personalized sound, without disturbing (or being disturbed by) other passengers who are enjoining a different audio-visual content.

Some cars include loudspeakers placed very close to an individual passenger, so that sound having an adequately high sound pressure level ("SPL") can be obtained at the ears of that individual passenger, whilst having a much lower SPL at the positions of other passengers.

The present inventor has observed that the concept of a personal sound cocoon is a useful way to understand the approach of having a loudspeaker placed close to a user, wherein the personal sound cocoon is a region in which a user is able to experience sound having an SPL deemed to be acceptably high for their enjoyment, whereas outside the personal sound cocoon the sound is deemed to have an SPL which is lower than it is within the personal sound cocoon.

The present inventor has also observed that creating a personal sound cocoon that can be enjoyed by the user with little sound leakage into his/her surroundings is a big challenge that if overcome could bring a huge change in how users experience our individual multimedia content in all kind of settings/surroundings such as (but not limited) to automotive, home, gaming, and aviation settings.

The present inventor has also observed that creating an effective personal sound cocoon may involve sound reduction or cancellation of sound outside of the cocoon.

A main audio system as used in most cars today (with one or more loudspeakers placed in the doors) is unable to provide an effective personal sound cocoon for each individual passenger.

Although the usage of headphones ensures a good sound quality and a very effective personal sound cocoon (little sound leakage), the use of headphones has safety, ergonomic and comfort problems. Similar considerations apply for standalone applications in other environments such as home, studio, public areas where individual entertainment is needed without disturbing neighbors.

The use of highly directive loudspeakers positioned close to an individual passenger/user brings an effective solution for medium and high frequencies. However, it is generally impractical in most situations to make a loudspeaker directive at bass frequencies, since in order to provide a highly directive loudspeaker for bass frequencies, the dimensions of the radiating surface must be of the same order as the wavelength, and wavelengths are typically very long for bass frequency content (e.g. $\lambda=3.4$ m for $f=100$ Hz). Loudspeakers with radiating surfaces of this scale for producing bass frequency content are impractical in many situations, such as in a car. Nonetheless, bass frequency content is a very important part of the audio spectrum and in most music this spectrum represents half or more of the total sound power.

As shown by the well-known equal-loudness contours [1] e.g. as standardized as ISO 226:2003, our ears have a low sensitivity to bass frequencies under 150 Hz. Therefore, in general, sound at bass frequencies needs to be boosted in order to balance the spectral loudness. Also, road noise or environmental noise will have a bigger masking effect on this part of the spectrum. However, the present inventor has found that the use of traditional monopole loudspeakers (typically a cone monopole loudspeaker) for the purpose of creating a personal sound cocoon for an individual user at bass frequency sound will in general not produce satisfactory results, since a relatively high SPL at bass frequencies is needed in order to create a personal sound cocoon to overcome the limited sensitivity of our ears in this region of the frequency spectrum, yet a traditional monopole loudspeaker will have a spherical radiation pattern at bass frequencies (same sound pressure in all directions), with its sound pressure dropping only with 6 dB for every double distance from the loudspeaker under free field conditions. Further, a car environment behaves not as a free field, making the use of monopole loudspeakers for bass frequency cocooning even more cumbersome: a small room will show a pressure chamber effect whereby it will boost the bass frequency energy provided by a monopole (overall pressure increases in the chamber of 12 dB/octave below 70 Hz for a typical car).

The present inventor is aware of several patent documents which describe using a variety of loudspeaker arrangements for the purpose of producing personal sound in vehicles:

EP0988771A1

EP1460879A1

U.S. Pat. No. 8,130,987B2

U.S. Pat. No. 7,688,992B2

U.S. Pat. No. 9,327,628B2

U.S. Pat. No. 9,440,566B2

U.S. Pat. No. 9,428,090B2

The present inventor is also aware of other loudspeaker arrangements for producing personal sound in other contexts:

WO2014143927A2

U.S. Pat. No. 7,692,363B2

Dipole loudspeakers and their directional characteristics are well described in the literature and some of the patent documents referenced above use dipole loudspeakers, mostly for the purpose of using the directional characteristics of a dipole loudspeaker to generate spatial effects in the mid and high frequency region, or to use a dipole loudspeaker for low frequency reproduction at large distances, e.g. normal stereo setup, see e.g. [2] for useful background information on this.

The present invention has been devised in light of the above considerations.

SUMMARY OF THE INVENTION

The present inventor has observed that dipole loudspeakers can provide an extremely effective personal sound cocoon at bass frequencies, thereby effectively providing a personal subwoofer.

In a first aspect, the present invention may provide:

A dipole loudspeaker for producing sound at bass frequencies, the dipole loudspeaker including:

- a diaphragm having a first radiating surface and a second radiating surface, wherein the first radiating surface and the second radiating surface are located on opposite faces of the diaphragm, and wherein the first and second radiating surfaces each have a surface area of at least 100 $cm^2$;
- a drive unit configured to move the diaphragm at bass frequencies such that the first and second radiating surfaces produce sound at bass frequencies, wherein the sound produced by the first radiating surface is in antiphase with sound produced by the second radiating surface;
- a frame, wherein the diaphragm is suspended from the frame via one or more suspension elements, wherein the frame is configured to allow sound produced by the first radiating surface to propagate out from a first side of the dipole loudspeaker and to allow sound produced by the second radiating surface to propagate out from a second side of the dipole loudspeaker.

In this way, sound produced by the first radiating surface is able to interfere with the sound produced by the second radiating surface. The present inventor has observed that this interference results in beneficial effects that may help to create a personal sound cocoon at bass frequencies.

In particular, the present inventor has observed that, for a suitably dimensioned diaphragm, from a listening position that is 40 cm or less (more preferably 30 cm or less, more preferably 25 cm or less, more preferably 20 cm or less, more preferably 15 cm or less) from the first radiating surface of such a loudspeaker (e.g. as measured along a principal radiating axis of the first radiating surface), a user can experience bass sound that is highly localized, in the sense that the sound pressure level (SPL) experienced by a user will quickly decrease with increasing distance from the loudspeaker.

Thus, a loudspeaker according to the first aspect of the invention is particularly well suited for helping to create a personal sound cocoon at bass frequencies.

The loudspeaker may be for use (e.g. configured to be used) with an ear of a user being located at a listening position (preferably each ear of a user being located at a respective listening position) that is in front of the first radiating surface and is 40 cm or less (more preferably 30 cm or less, more preferably 25 cm or less, more preferably 20 cm or less, more preferably 15 cm or less) from the first radiating surface.

The terms “user” and “listener” may be used interchangeably in this disclosure.

Here it is to be noted that although the(/each) listening position has defined with respect to front of the first radiating surface, this does not rule out the possibility of a similar effect being achievable in front of the second radiating surface. Indeed, it is expected that a similar effect could be achieved in front of the second radiating surface since the frame is configured to allow sound produced by the first radiating surface to propagate out from a first side of the dipole loudspeaker and to allow sound produced by the second radiating surface to propagate out from a second side of the dipole loudspeaker, e.g. so that sound produced by the first radiating surface is able to interfere with the sound produced by the second radiating surface.

Without wishing to be bound by theory, the inventor believes that the effects referred to above are due to the sound produced by the first radiating surface interfering with (antiphase) sound produced by the second radiating surface, which the inventor believes helps to achieve a sharp reduction in SPL with distance from the listening position (compared with an equivalent monopole). This effect is described in more detail below with reference to the enclosed drawings.

In view of the technical discussions contained herein, a skilled person would appreciate that the frame should be adequately open at both the first and second sides of the loudspeaker, i.e. to mostly avoid getting in the way of sound produced by the first and second radiating surfaces, so that sound produced by the first and second radiating surfaces could interfere with each other without being overly inhibited or guided by the frame.

A skilled person would appreciate that the extent to which the frame is open at the first and second sides of the loudspeaker will depend on a number of factors such as the level of personal sound cocooning desired, the size of personal sound cocoon desired, and other design considerations (e.g. implementing the loudspeaker in a car headrest may require some of the frame or other structure to be located in front of the first and/or second radiating surfaces).

Accordingly, the degree to which the frame should be open at the first and second sides of the loudspeaker to achieve a desired level of personal sound cocooning cannot readily be defined in a precise manner. However, the following paragraphs provide various example guidelines which may be useful for a skilled person in determining the extent to which the frame should be open at the first and second sides of the loudspeaker.

The dipole loudspeaker may be configured (e.g. by appropriately arranging and sizing the diaphragm and frame and/or adjusting the path length) such that the SPL of sound produced by the loudspeaker at a bass frequency of 60 Hz as measured at 80 cm from the first radiating surface along a principal radiating axis of the first radiating surface is at least 20 dB (more preferably at least 25 dB) lower than the SPL of the same sound as measured at 10 cm from the first radiating surface along the principal radiating axis of the first radiating surface in a free field condition.

Herein, a free field condition may be understood as anechoic conditions, e.g. as might be measured in an anechoic chamber.

A drop off in SPL of 20 dB between these distances is believed by the present inventor to be more than what even a small monopole loudspeaker could achieve at a bass frequency of 60 Hz between such distances (believed by the inventor to be ~18 dB). In the examples discussed below, a drop off in SPL of 26 dB was achieved at a bass frequency of 60 Hz between these distances using a diaphragm having radiating surfaces each have a surface area of 540 $cm^2$. With a smaller diaphragm (and/or reduced path length), the present inventor believes an ever larger drop off in SPL between these distances at a bass frequency of 60 Hz could be achieved.

Herein, a principal radiating axis of a radiating surface may be understood as an axis along which the radiating surface produces direct sound at maximum amplitude (sound pressure level). Typically, the principal radiating axis will extend outwardly from a central location on the radiating surface. The principal radiating axes of the first and second radiating surfaces will in general extend in opposite directions, since they are located on opposite faces of the diaphragm.

The dipole loudspeaker may have a path length D that is 25 cm or less, more preferably 20 cm or less, more preferably 15 cm or less, wherein path length D may be defined by the equation $$D = \frac{c}{6 \cdot f_{equal}},$$

where c is the speed of sound (343 m/s), and where $f_{equal}$ is a frequency at which the sound pressure of the dipole is equal to the sound of an equivalent monopole in a free field condition as measured at a location on the principal radiating axis of the first radiating surface. As noted in the "Supplementary explanation" section, below, the location on the principal radiating axis of the first radiating surface may be 1 metre from the first radiating surface. As a skilled person would appreciate, $f_{equal}$ can be calculated by measurement or simulation in a variety of different ways. An example methodology of how $f_{equal}$ can be calculated is set out in [3], for example.

The loudspeaker may incorporate features that influence the path length, and therefore influence the personal sound cocoon obtained by the loudspeaker (since, in general a larger path length will increase the size of the personal sound cocoon and a small path length will decrease the size of the personal sound cocoon).

For example, the diaphragm may include one or more holes which extend from the first radiating surface to the second radiating surface. Such holes may cause the path length of the loudspeaker to be reduced (compared to a loudspeaker lacking the holes), and may be referred to as "tuning holes" herein.

For example, the diaphragm may be mounted in a baffle with no gaps between the diaphragm and the baffle. Such a baffle may cause the path length of the loudspeaker to be increased (compared to a loudspeaker lacking the baffle).

Path length D, and its relationship to creating a personal sound cocoon, is described in more detail below, see e.g. the "Supplementary explanation" section, below.

In certain applications, the loudspeaker may include one or more non-rigid elements situated in front of the first radiating surface and/or the second radiating surface, e.g. for aesthetic or design reasons (e.g. a car headrest generally requires covering with soft material). In this case, the one or more non-rigid elements are preferably configured to avoid disrupting the sound produced by the first and/or second radiating surface, e.g. by choosing materials that are adequately acoustic transparent. However, sound produced by the first and second radiating surfaces will in general not be free to propagate until they have passed through any one or more non-rigid elements situated in front of the first and/or second radiating surface. In some embodiments, the distance between a point on a principal radiating axis of the first radiating surface from which sound produced by the first radiating surface is free to propagate and a point on a principal radiating axis of the second radiating surface from which sound produced by the second radiating surface is free to propagate may be 30 cm or less (more preferably 25 cm or less, more preferably 20 cm or less).

Whilst the above paragraphs provide various example guidelines which may be useful for a skilled person in determining the extent to which the frame should be open at the first and second sides of the loudspeaker, other guidelines may equally be considered by a skilled person.

The bass frequencies at which the drive unit is configured to move the diaphragm preferably includes frequencies across the range 60-80 Hz, more preferably a frequencies across the range 50-100 Hz, more preferably a frequencies across the range 40-100 Hz, and my include frequencies across the range 40-160 Hz. At these frequencies, the present inventor has found that the loudspeaker is able to produce a particularly useful personal sound cocoon.

Moving the diaphragm at frequencies below 40 Hz may be useful for some applications, but not for others (such as in a car, where below 40 Hz background noise tends to be too loud).

Above 160 Hz, the present inventor has found that the "cocooning" effect worsens considerably. Therefore, the drive unit may be configured to move the diaphragm at frequencies that do not exceed 250 Hz, 200 Hz, or even 160 Hz. This may help to ensure the loudspeaker achieves a desired level of "cocooning", as can be understood with reference to FIG. 6 and the associated discussion below.

In view of the above considerations, the loudspeaker is preferably (configured as) a subwoofer. A subwoofer can be understood as a loudspeaker dedicated to (rather than suitable for) producing sound at bass frequencies.

In other applications (e.g. where cocooning is not required), the drive circuitry may be configured to provide the drive unit with a respective electrical signal that includes frequencies that exceed 250 Hz, and could provide a full range of frequencies e.g. up to 20 kHz or higher.

In view of considerations explained in more detail below with reference to FIG. 5, the first and/or second radiating surfaces may each have a surface area of at least 100 $cm^2$, more preferably at least 150 $cm^2$, more preferably at least 200 $cm^2$, more preferably at least 250 $cm^2$. In some cases, the first and/or second radiating surfaces may each have a surface area of at least 300 $cm^2$, or at least 400 $cm^2$.

In order to maximize the surface area of the first and second radiating surfaces within other design constraints (e.g. incorporating the loudspeaker into a car headrest), the diaphragm may have a non-circular shape, e.g. a rectangular or square shape.

In the context of this disclosure, the term frame is intended to encompass any substantially rigid structure from which a diaphragm can be suspended.

The diaphragm may take various forms.

By way of example, the diaphragm may be a single (monolithic) piece of material. The material is preferably lightweight, e.g. having a density of 0.1 $g/cm^3$ or less. The material may be extruded polystyrene or extruded polypropylene or similar.

In some examples, the diaphragm may be covered by a skin, e.g. to protect the diaphragm. The skin could e.g. be of paper, carbon fiber, plastic foil, for example.

In some examples, the diaphragm may include several pieces of material attached together, e.g. by glue. For example, the diaphragm may include a first cone and a second cone, wherein the first and second cones are glued back to back. The first and second cones may e.g. be made of paper.

The first and second radiating surfaces could be circular, rectangular, rectangular with rounded corners, or indeed have a more freeform shape.

The one or more suspension elements via which the diaphragm is suspended from the frame may take a variety of forms.

Suspension elements for loudspeakers are well known, and a variety of different types of suspension elements may be used in each case where one or more suspension elements are recited in the present disclosure. For example, a suspension element referred to herein may be a roll suspension, a metal spring, a rubber band etc.

By way of example, the one or more suspension elements via which the diaphragm is suspended from the frame may include one or more suspension elements (e.g. one or more roll suspensions) attached between the first radiating surface and the frame, and one more suspension elements (e.g. one or more roll suspensions) attached between the second radiating surface and the frame. Preferably, the one or more suspension elements (e.g. one or more roll suspensions) attached between the first radiating surface and the frame correspond to (e.g. match, e.g. match in position, number and length) the one or more suspension elements (e.g. one or more roll suspensions) attached between the second radiating surface and the frame. This matching of suspension elements is particularly useful if the diaphragm is non-circular, since it may help to eliminate any asymmetries in the performance of the suspension elements attached to one radiating surface of the diaphragm.

The one or more suspension elements may be tuned to have a resonance frequency that is below the frequency spectrum over which the loudspeaker is configured to operate, e.g. to maximize the efficiency of the loudspeaker in the frequency spectrum of interest.

The drive unit may be an electromagnetic drive unit that includes a magnet unit configured to produce a magnetic field, and a voice coil attached to the diaphragm. In use, the voice coil may be energized (have a current passed through it) to produce a magnetic field which interacts with the magnetic field produced by the magnet unit and which causes the voice coil (and therefore the diaphragm) to move relative to the magnet unit. The magnet unit may include a permanent magnet. The magnet unit may be configured to provide an air gap, and may be configured to provide a magnetic field in the air gap. The voice coil may be configured to sit in the air gap when the diaphragm is at rest. Such drive units are well known.

The magnet unit may be located in front of the second radiating surface of the diaphragm. The loudspeaker may include a safety element which is located between the magnet unit and the second radiating surface of the diaphragm. The safety element may be configured to prevent the magnet unit from passing through the diaphragm, e.g. in a crash event or another event that involves a sudden deceleration of the loudspeaker (e.g. where the loudspeaker has been moving in the direction of the principal radiating axis of the first radiating surface). The safety element is preferably rigid. The safety element may be a voice coil coupler.

Such a safety element may be particularly useful if the loudspeaker is mounted in a headrest of a vehicle seat, e.g. as described with reference to the second and third aspects of the invention (below), since it may help to provide protection for a person sat in such a seat in the event of a vehicle crash.

The voice coil may be attached to the diaphragm, e.g. to the second radiating surface of the diaphragm. The voice coil may be attached to (e.g. the second radiating surface of) the diaphragm via a voice coil coupler. The voice coil coupler may also be a safety element, as described above.

The frame may include one or more rigid supporting elements (e.g. arms) configured to hold a magnet unit of the drive unit in front of the first and/or second radiating surface of the diaphragm (preferably in front of the second radiating surface of the diaphragm). The frame from which the diaphragm is suspended may include one or more mounting legs which extend into one or more (respective) cavities in the diaphragm, wherein the diaphragm is suspended from the one or more mounting legs via one or more suspension elements.

The diaphragm may include one or more cut-outs in one of the radiating surfaces (preferably the second radiating surface), wherein each cut-out is configured to have a respective rigid supporting element extend through it when the loudspeaker is in use. This may allow the loudspeaker to have a lower profile in the thickness direction of the diaphragm.

Alternatively, in some examples, the magnet unit may be suspended from the diaphragm via one or more suspension elements.

In a first set of examples (some non-limiting examples of which are illustrated below), the frame from which the diaphragm is suspended is a first frame, wherein the diaphragm is suspended from the first frame via one or more primary suspension elements, and wherein the first frame is suspended from a second frame via one or more secondary suspension elements.

As explained in more detail below, the use of a first frame suspended from a second frame (as in the first set of examples) may be useful to reduce vibrations passing from the loudspeaker into the environment.

The one or more secondary suspension elements may be tuned to have a resonance frequency that is below the frequency spectrum over which the loudspeaker is configured to operate, e.g. so as to limit the force on a supporting structure. The one or more secondary suspension elements may be tuned to have a resonance frequency that is lower than a resonance frequency that the one or more primary suspension elements are tuned to have. The one or more secondary suspension elements may be tuned to have a resonance frequency that is 20 Hz or lower, more preferably 10 Hz or lower, more preferably 5 Hz or lower.

The first frame may include a rigid body which extends around a diaphragm axis along which the drive unit is configured to move the diaphragm. The first frame is preferably located radially outwards from the diaphragm, relative to the diaphragm axis.

The first frame may include one or more rigid supporting elements (e.g. arms) configured to hold a magnet unit of the drive unit in front of the first and/or second radiating surface of the diaphragm (preferably in front of the second radiating surface of the diaphragm).

The diaphragm may include one or more cut-outs in one of the radiating surfaces (preferably the second radiating surface), wherein each cut-out is configured to have a respective rigid supporting element extend through it when the loudspeaker is in use. This may allow the loudspeaker to have a lower profile in the thickness direction of the diaphragm.

The second frame may include a rigid body which extends around a diaphragm axis along which the drive unit is configured to move the diaphragm. The second frame is preferably located radially outwards from the first frame, relative to the diaphragm axis. The second frame may be part of, or may be configured to fixedly attach to, a rigid supporting structure, such as a car seat frame.

Various optional features of the first set of examples are described with reference to the drawings below. These features may be used singly or in any combination in connection with the first set of examples described herein.

In a second set of examples (some non-limiting examples of which are illustrated below), the frame from which the diaphragm is suspended is part of or configured to fixedly attach to, a rigid supporting structure, such as a car seat frame.

For example, the frame from which the diaphragm is suspended may include one or more mounting legs which extend into one or more (respective) cavities in the diaphragm, wherein the diaphragm is suspended from the one or more mounting legs via one or more suspension elements. The mounting legs may be part of, or may be configured to fixedly attach to, a rigid supporting structure, such as a car seat frame, for example.

In the second set of examples, the magnet unit may be suspended from the diaphragm via one or more magnet unit suspension elements. This is particularly appropriate where the diaphragm is suspended from one or more mounting legs.

The one or more magnet unit suspension elements may include one or more (preferably two or more) spiders for example, wherein a spider may be understood as a textile ring having circumferentially extending corrugations (which may facilitate movement along the longitudinal axis whilst movement perpendicular to this axis), as is known in the art. Other suspension element forms may be considered by a skilled person, e.g. springs such as metal springs.

Various optional features of the second set of examples are described with reference to the drawings below. These features may be used singly or in any combination in connection with the second set of examples described herein.

The loudspeaker may be configured for use in performing noise cancelation, e.g. at bass frequencies. For example, the drive unit may be configured to drive the diaphragm (e.g. at bass frequencies) so that the first radiating surface produces sound configured to cancel environmental sound as detected by one or more microphones. This may be of use in a noisy environment, such as in a car or aeroplane, e.g. where the loudspeaker is part of a seat assembly including a vehicle seat. Noise cancellation techniques are well-known.

A loudspeaker according to the first aspect of the invention may find utility in any application where it might be desirable to provide a personal sound cocoon.

In a second aspect, the present invention may provide:

A dipole loudspeaker for producing sound at bass frequencies, the dipole loudspeaker including:

an array of two or more diaphragms, each diaphragm in the array having a first radiating surface and a second radiating surface, wherein the first radiating surface and the second radiating surface are located on opposite faces of the diaphragm, wherein the first radiating surfaces have a combined surface area of at least 100 $cm^2$, and wherein the second radiating surfaces have a combined surface area of at least 100 $cm^2$;

a plurality of drive units, wherein each drive unit is configured to move a respective one of the diaphragms in the array at bass frequencies such that the first and second radiating surfaces of the diaphragm produce sound at bass frequencies, wherein the sound produced by the first radiating surfaces is in antiphase with sound produced by the second radiating surfaces;

a frame, wherein each diaphragm in the array is suspended from the frame via one or more suspension elements, wherein the frame is configured to allow sound produced by the first radiating surfaces to propagate out from a first side of the dipole loudspeaker and to allow sound produced by the second radiating surfaces to propagate out from a second side of the dipole loudspeaker.

This arrangement provides substantially the same effects as a loudspeaker according to the first aspect of the invention, but by using more than one diaphragm. This may be useful to provide stereo sound to the different ears of a user, or alternatively to compensate for movement of a user's head.

In view of considerations explained in more detail below with reference to FIG. 5, the first radiating surfaces may have a combined surface area of at least 100 $cm^2$, more preferably at least 150 $cm^2$, more preferably at least 200 $cm^2$, more preferably at least 250 $cm^2$. In some cases, the first radiating surfaces may have a combined surface area of at least 300 $cm^2$, or at least 400 $cm^2$. Similarly, the second radiating surfaces may have a combined surface area of at least 100 $cm^2$, more preferably at least 150 $cm^2$, more preferably at least 200 $cm^2$, more preferably at least 250 $cm^2$. In some cases, the second radiating surfaces may have a combined surface area of at least 300 $cm^2$, or at least 400 $cm^2$.

The loudspeaker may be for use (e.g. configured to be used) with a first ear of a user being located at a first listening position that is in front and is 40 cm or less (more preferably 30 cm or less, more preferably 25 cm or less, more preferably 20 cm or less, more preferably 15 cm or less) from the first radiating surface of a first one of the diaphragms whilst a second ear of the user is located at a second listening position that is in front and is 40 cm or less (more preferably 30 cm or less, more preferably 25 cm or less, more preferably 20 cm or less, more preferably 15 cm or less) from the first radiating surface of a second one of the diaphragms. The first diaphragm is preferably different from the second diaphragm, but could in some examples be the same diaphragm.

Preferably, the diaphragms are suspended from the frame such that the first radiating surface of each diaphragm faces in a same direction, e.g. in a forwards direction.

However, for avoidance of any doubt, the principal radiating axes of the multiple diaphragms need not be parallel to each other in order to be considered as facing in the same direction, and may be arranged e.g. with the principal radiating axes of the first radiating surfaces being arranged to converge or diverge.

The sound provided to the first ear of the user may be different compared to the sound provided to the second ear of the user. This may be useful to provide stereo sound to the different ears of a user, or alternatively to compensate for movement of a user's head (as explained below).

The loudspeaker may include drive circuitry configured to provide each drive unit with a respective electrical signal derived from the same audio source such that the sound produced by the second radiating surfaces is out of phase with respect to the sound produced by the first radiating surfaces.

Preferably, the drive circuitry includes a signal processing unit (not shown), which may be a digital signal processor or "DSP", configured to provide each drive unit with a respective electrical signal derived from an audio signal provided by the audio source. An advantage provided by such a signal processing unit is that the signal processing unit can be used not only to provide each drive unit with a respective electrical signal derived from the same audio source such that the same electrical signal is provided to each drive unit, but can also be used to manipulate the electrical signal respectively provided to each drive unit, e.g. to modify the phase, delay or amplitude of the electrical signal respectively provided to each drive unit, e.g. so as to optimise the sound provided to a user.

Preferably, the seat assembly includes a head tracking unit configured to track head movement of a user sat in the seat. Head tracking and face recognition technology based on video monitoring/processing is a known technology that is finding its way into cars for various purposes such as safety (to detect and then prevent a driver from falling asleep) and gesture control, see e.g. [5]-[9]. Head tracking based on one or more ultrasonic sensors may also be possible.

Preferably, the drive circuitry is configured to modify the electrical signals provided to the drive units configured to move the first and second diaphragms (e.g. using the signal processing unit) based on head movement as tracked by the head tracking unit, e.g. to compensate for movement of the head of a user sat in the seat.

Compensation for head movement may involve adjusting any one or more of amplitude (u), delay (t) and phase ($\phi$)) of one or more of the electrical signals, e.g. according suitable algorithms.

For example, in a simple example, the drive circuitry may be configured to increase the amplitude of sound produced by one of the first and second diaphragms if it is determined based on head movement as tracked by the head tracking unit that an ear of the user has moved further away from the first radiating surface of that diaphragm. Similarly, the drive circuitry may be configured to decrease the amplitude of sound produced by one of the first and second diaphragms if it is determined based on head movement as tracked by the head tracking unit that an ear of the user has moved closer to the first radiating surface of that diaphragm. It would be straightforward for a skilled person to adapt existing head tracking technologies e.g. as discussed in [5]-[9] to this purpose In some examples of the second aspect of the invention, the frame from which each diaphragm is suspended is a second frame, wherein the diaphragms are suspended from one or more first frames (optionally one first frame) via one or more primary suspension elements, wherein the/each first frame is suspended from the second frame via one or more secondary suspension elements. Note that in this case the diaphragms can be viewed as being suspended from the second frame via the first frame(s) and primary suspension elements.

In some examples of the second aspect of the invention, the frame from which each diaphragm is suspended is part of or configured to fixedly attach to, a rigid supporting structure, such as a car seat frame.

A loudspeaker according to the second aspect of the invention may include any feature described in connection with the first aspect of the invention, except where such a combination is clearly impermissible or expressly avoided.

In particular, features described in relation to the surface area of the first radiating surface or the second radiating surface of the diaphragm of a loudspeaker according to the first aspect of the invention may respectively apply to the combined surface area of the first radiating surfaces or the second radiating surfaces of the diaphragms of a loudspeaker according to the second aspect of the invention.

Also, features described in relation to the diaphragm, drive unit, or first frame of a loudspeaker according to the first aspect of the invention may respectively apply to each diaphragm, drive unit, or first frame of a loudspeaker according to the second aspect of the invention.

In a third aspect, the present invention may provide a seat assembly including a seat and a loudspeaker according to the first aspect or second aspect of the present invention.

Preferably, the seat is configured to position a user who is sat down in the seat such that an ear of the user is located at a listening position as described above, e.g. with an ear of the user is located at a listening position (preferably each ear of a user is located at a respective listening position) that is 40 cm or less (more preferably 30 cm or less, more preferably 25 cm or less, more preferably 20 cm or less, more preferably 15 cm or less) from the first radiating surface of the loudspeaker.

The loudspeaker may be mounted within a headrest of the seat ("seat headrest"). Since a typical headrest is configured to be a small distance (e.g. 30 cm or less) from the ear(s) of a user who is sat down in a seat, this is a particularly convenient way of configuring the seat to position a user who is sat down in the seat such that an ear of the user is located at a listening position that is a small distance (e.g. 30 cm or less) from the first radiating surface of the loudspeaker A seat headrest typically has a front surface configured to face towards the head of a user sat in the seat, and a back surface configured to face away from the head of a user sat in the seat. The loudspeaker is preferably mounted within the headrest of the seat e.g. with the first radiating surface of the loudspeaker facing the front surface of the headrest, e.g. with a principal axis of the first radiating surface extending out through the front surface of the headrest.

The seat may have a rigid seat frame. A frame of the loudspeaker may be part of or fixedly attached to the rigid seat frame. For example, in the first set of examples discussed above, the second frame of the loudspeaker may be part of or fixedly attached to the rigid seat frame. For example, in the second set of examples discussed above, the frame of the loudspeaker may be part of or fixedly attached to the rigid seat frame.

The seat may be a vehicle seat, for use in a vehicle such as a car ("car seat") or an aeroplane ("plane seat").

The seat could be a seat for use outside of a vehicle. For example, the seat could be a seat for a computer game player, a seat for use in studio monitoring or home entertainment.

In a fourth aspect, the present invention may provide a vehicle (e.g. a car or an aeroplane) having a plurality of seat assemblies according to the third aspect of the invention.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which:

FIGS. 1A to 1C are theoretical diagrams illustrating the differences between monopole and dipole loudspeakers.

FIG. 2 provides the results of a finite element simulation of an oscillating infinitely thin disc diaphragm in various conditions.

DETAILED DESCRIPTION OF THE INVENTION

Figure 3:
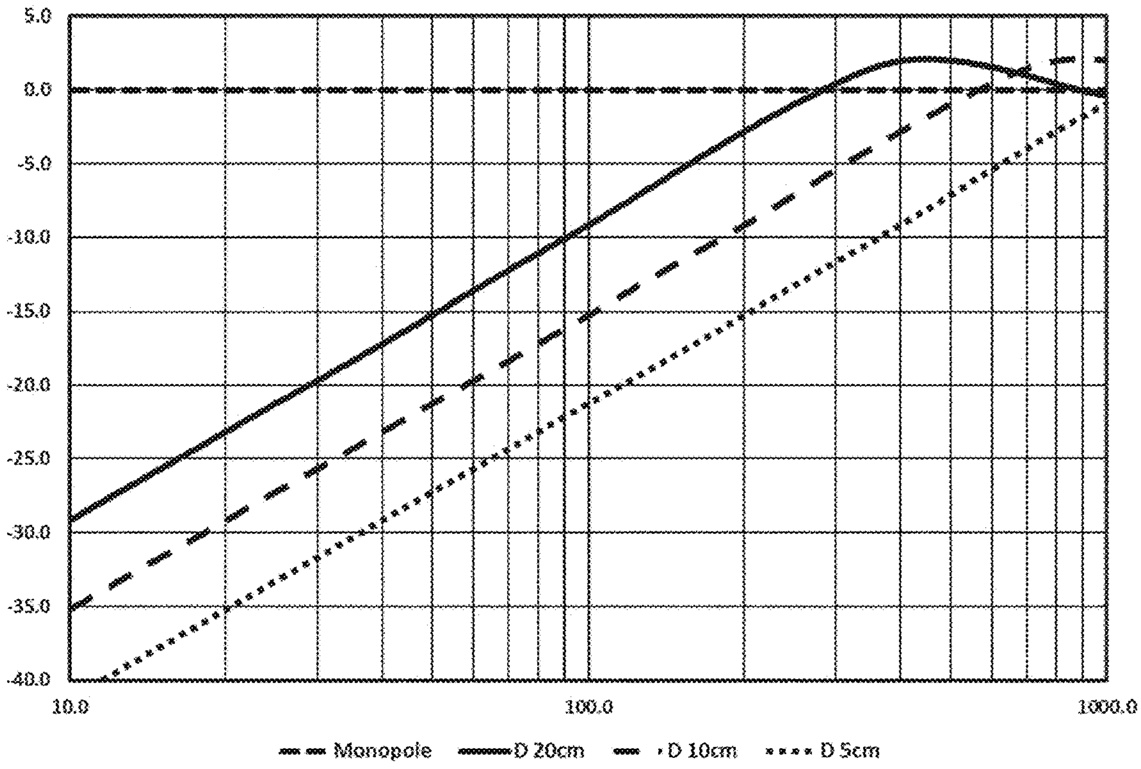
FIG. 3 illustrates the effect of path length D on SPL for a dipole loudspeaker compared with an equivalent monopole loudspeaker.

Aspects and examples of the present invention will now be discussed with reference to the accompanying figures. Further aspects and examples will be apparent to those skilled in the art. All documents mentioned in this text are incorporated herein by reference.

The present inventor has carried out experiments with dipole loudspeakers that were constructed specifically for producing sound at pure bass frequencies (e.g. in the range 10 Hz to 150 Hz) nearby a listener, with results that have been found to be very convincing. In the experiments, the perceived quality of the bass was extremely high and the personal sound cocoon obtained within this low frequency band was better than had been experienced previously, such that a person standing next to the person experiencing low frequency sound produced by the dipole loudspeaker (enjoying the bass spectacle) could only hear the mid to high frequencies leaking from the cocoon. These experiments demonstrated to the present inventor the potential of using the technology described herein in all possible audio application such as automotive, aviation, gaming, studio monitoring, home entertainment. In noisy environments, the present invention could also be used for noise cancelation at bass frequencies, e.g. if integrated in a seat assembly including a vehicle seat such as an airplane seat or a car seat.

As discussed in the background section (above), it is known to use the directional characteristics of a dipole loudspeaker to generate spatial effects in the mid and high frequency region, as well as to use a dipole loudspeaker for low frequency reproduction at large distances.

However, the present disclosure takes a different approach, and in some examples seeks to use a dipole loudspeaker, preferably mounted in a frame that is adequately open on both sides as described above (thereby providing what the inventor refers to as a “thru dipole”), to produce a personal sound cocoon in which the head of a user is located very close to a radiating surface of the dipole loudspeaker, by making use of the dipole loudspeaker’s proximity effect close to the diaphragm and the cancelation of sound in the far away from it and off-axis. In practice, the loudspeaker may be implemented as a subwoofer and may be incorporated into a headrest, e.g. of a vehicle seat such as a car seat.

The present inventor has observed that a dipole loudspeaker has useful characteristics for creating a low frequency personal sound cocoon.

In particular, the present inventor has observed that in the far field, a dipole loudspeaker has an SPL that drops more quickly with frequency as compared with an equivalent monopole at frequencies below $f_{equal}$ (an additional 6 dB per octave drop as compared with an equivalent monopole), as illustrated e.g. by FIG. 2 which is described in more detail below. Here it is noted that $f_{equal}$ is the frequency at which the SPL of the dipole equals that of an equivalent monopole loudspeaker (this parameter is discussed in more detail in the “Supplementary explanation” section). However, near the dipole loudspeaker, at small distance, the SPL will almost equal that of an equivalent monopole loudspeaker (proximity effect).

In general, the present disclosure avoids using the term “nearfield” to describe the potential use of a dipole loudspeaker, since “nearfield” typically refers to a few cm from a loudspeaker, whereas in this disclosure it is envisaged that a listening position may be much further from a radiating surface, perhaps up to 1 or 2 times the path length D of a dipole loudspeaker.

Further the present inventor has observed that a dipole loudspeaker will not pressurize a small listening space such as a vehicle interior or listening room (as does a monopole loudspeaker) since a dipole loudspeaker cancels by itself. So, compared to the pressurizing effect of a monopole loudspeaker in a small listening space, the advantage of using a dipole loudspeaker for producing low frequencies in small listening spaces is even more beneficial.

In connection with this, it’s worth mentioning that in a typical car, this pressurizing effect results in a boost of 12 dB per octave below 70 Hz (i.e. reducing frequency by an octave will result in SPL for a small listening space being boosted by 12 dB compared with an open space). This pressurizing effect only applies to monopole loudspeakers, not dipole loudspeakers.

The present inventor has further observed that the well-known equal-loudness contours [1], which shows that ears have a low sensitivity to bass frequencies under 150 Hz, will also help to limit the dimensions of a personal sound cocoon as produced by a loudspeaker producing bass frequencies as described herein, since at low frequencies (10 Hz-150 Hz), the SPL needs to be relatively high (compared to mid-range frequencies such as 1000 Hz) in order to be heard, but a small drop in SPL at a user causes a large drop in the perceived volume experienced by that user. In other words, the dynamic range of the human ear is reduced at low frequencies (since e.g. a full range of perceived volumes can be achieved from actual SPL range of 60-120 dB at 30 Hz, whereas an SPL range of 0-100 dB is needed to give the same dynamic range at 1000 Hz). Thus, the quick drop off in SPL with distance using a dipole loudspeaker will have a bigger effect in the drop off in perceived loudness experienced at lower frequencies, due to the reduced dynamic range of the human ear at such frequencies. The following discussion provides a summary of observed differences between dipole and monopole loudspeakers.

FIGS. 1A to 1C are theoretical diagrams illustrating the differences between monopole and dipole loudspeakers at different angles to a principal radiating axis.

In particular, FIG. 1A shows a baffled monopole loudspeaker and FIG. 1C shows an equivalent dipole loudspeaker. Both loudspeakers have a circular diaphragm of radius a, but the baffled monopole loudspeaker has an infinite path length (either by having an infinitely long baffle or a closed baffle such that the sound waves from one side of the diaphragm do not reach those from the other side of the diaphragm), whereas the dipole loudspeaker has a path length D which is approximately equal to the radius a. If the diaphragm of the dipole loudspeaker were mounted in a circular disc baffle of radius b with no gaps between the diaphragm and the baffle, then the path length D of the dipole loudspeaker would be approximately equal to the radius b added to the thickness of the baffle.

Path length is explained in more detail in the "Supplementary explanation" section, below.

FIG. 1B shows the SPL as calculated at frequency $f_{equal}$ at a large distance from the loudspeaker (although the same calculations ought to be valid at closer distances as well, e.g. 1 m) in full space (4 pi space) in a free field condition as the angle is varied with respect to a principal radiating axis of the loudspeaker for both the monopole loudspeaker shown in FIG. 1A (dotted line) and the dipole loudspeaker shown in FIG. 1B (solid line). $f_{equal}$ is explained in more detail in the "Supplementary explanation" section, below.

FIG. 1B shows that a monopole loudspeaker radiating in full free space at low frequencies where the wavelength is much larger than the largest dimension of the diaphragm (as is the case here) will provide a 360° omnidirectional pressure response. FIG. 1B also shows that for a dipole loudspeaker radiating in full free space, the 360° pressure response will follow a cosine function with nulls at 90° and 270°. FIG. 1B shows that off axis, SPL drops off very quickly with increasing angle from the principal radiating axis for a dipole loudspeaker (because sound on both sides of dipole cancel each other), with a zero at 90°.

As a skilled person would appreciate, if the path length of a dipole loudspeaker is increased, then the frequency at which the SPL for the dipole equates to that of an equivalent monopole loudspeaker decreases (this effect is shown in FIG. 3, below). FIG. 2, which is based on [4], which is a paper by Mellow and Kärkkäinen, provides the results of a finite element simulation of an oscillating infinitely thin disc diaphragm in various conditions.

In more detail, FIG. 2 provides the results of a finite element simulation of an oscillating infinitely thin disc diaphragm in the "far field" for the following conditions: (i) the disc is mounted in an infinite planar baffle which equates to a perfect monopole radiating into half space (2 pi space) in a free field condition [as shown by the dashed flat line]; (ii) the disc is on its own with no baffle which equates to a perfect dipole radiating into full space (4 pi space) in a free field condition [as shown by the solid line]; (iii) the disc mounted as a monopole in an infinitely long tube (as illustrated by FIG. 1A) radiating into full space (4 pi space) in a free field condition [as shown by the dotted line].

A key point to observe from FIG. 2 is that the monopole configurations (dashed and dotted lines) result in an SPL that is roughly constant at lower frequencies, whereas a pure dipole has an SPL that drops off quickly with decreasing frequency. FIG. 2 helps to show that results from an advanced finite element calculation for a real diaphragm (as shown in FIG. 2) is in line with the simplified models discussed below.

FIG. 3 illustrates the effect of path length D on SPL for a dipole loudspeaker compared with an equivalent monopole loudspeaker.

In more detail, FIG. 3 shows SPL vs frequency for a dipole loudspeaker having different values of path length D (D=20 cm, 10 cm, 5 cm) compared with a monopole loudspeaker, when the loudspeakers are radiating into full space (4 pi space) in a free field condition at a large distance. As demonstrated by FIG. 3, as D increases, performance becomes more monopole-like at low frequencies, and the frequency $f_{equal}$ at which the SPL produced by the dipole equals that of the equivalent monopole decreases.

Figure 4:
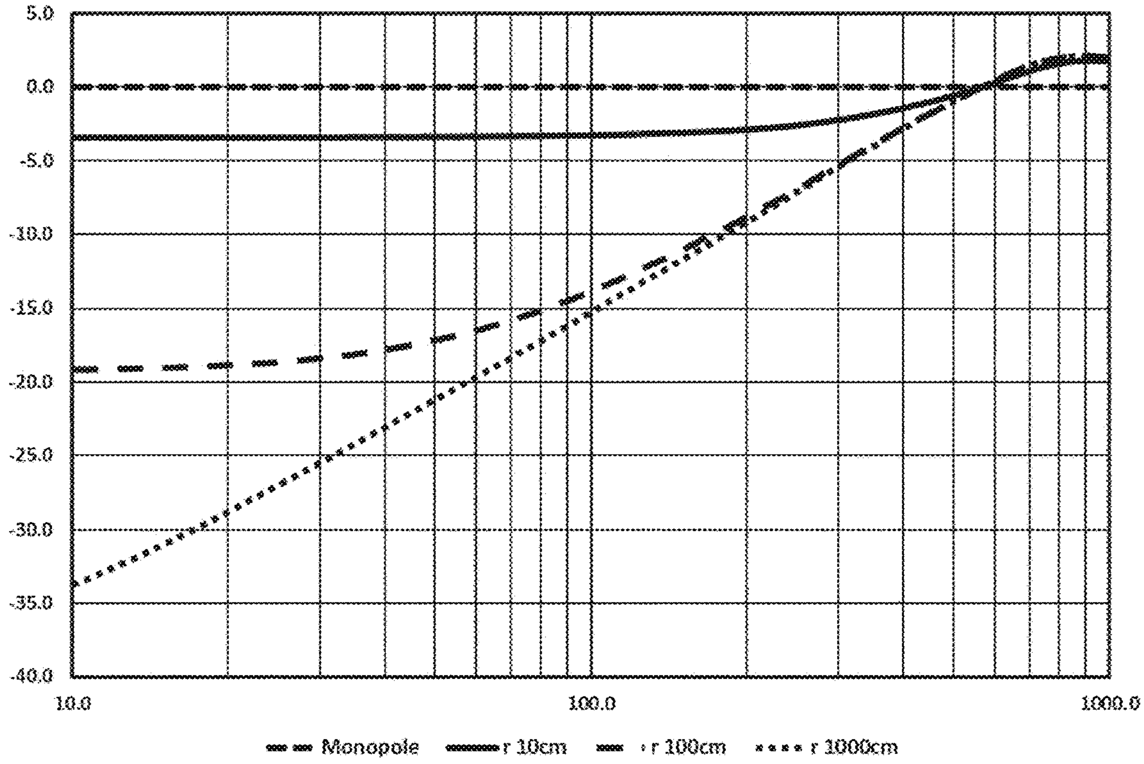
FIG. 4 illustrates the effect of distance r from a dipole loudspeaker on SPL compared with an equivalent monopole loudspeaker.

FIG. 4 illustrates the effect of distance r from a dipole loudspeaker on SPL compared with an equivalent monopole loudspeaker.

In more detail, FIG. 4 shows SPL vs frequency for a dipole loudspeaker having a path length D=10 cm for different values of distance r from the dipole loudspeaker (r=10 cm, 100 cm, 1000 cm) compared with a monopole loudspeaker, when the loudspeakers are radiating into full space (4 pi space) in a free field condition. As demonstrated by FIG. 4, as distance from the dipole loudspeaker is reduced, the SPL produced by the dipole loudspeaker will become more monopole-like at low frequencies due to a proximity effect (very close to the loudspeaker the SPL will be effectively the same as for the monopole), though the frequency $f_{equal}$ at which the SPL produced by the dipole equals that of the equivalent monopole remains the same.

FIG. 4 shows how, at a listening position that is located at a distance r from a radiating surface of a dipole loudspeaker that is comparable to path length D, the SPL produced by the dipole loudspeaker at low frequencies can be comparable to that produced by an equivalent monopole loudspeaker, whereas at larger distances, the SPL can be considerably reduced compared to an equivalent monopole loudspeaker, thereby obtaining a useful cocooning effect at low frequencies.

Thus, low frequency dipole loudspeaker situated close to a listening position to be occupied by a head of a user (which could be achieved, for example, by integrating the dipole loudspeaker into a headrest) can offer a solution for the problems described in the background section as regards how to provide a personal sound cocoon for low frequencies, e.g. with a view to reproducing different low frequency content for different passengers in a car.

A skilled person would appreciate that various considerations should be considered in order to obtain a desired level of cocooning from a dipole loudspeaker for a given application.

One consideration is that it may be desirable to obtain an adequately large SPL close to the loudspeaker in a bass frequency range, such as 40 Hz to 160 Hz. Other frequency ranges are possible and will vary from application to application, although starting from 40 Hz is satisfactory in noisy environments. Frequency ranges extending below 40 Hz may be useful in silent environments such as a recording studio or home.

The upper limit frequency of our nearfield dipole subwoofer will be defined by the level of cocooning we want to achieve since, as can be seen from the above discussions, the ability to provide an effective personal sound cocoon worsens as frequency increases. As can be deducted from the well-known equal-loudness contours [1] e.g. as standardized as ISO 226:2003, the sensitivity of our ears decreases for lower frequencies. Therefore, it may be desirable to provide a loudspeaker capable of producing sound having an SPL in the range 80 dB to 110 dB (or higher) at a listening position as defined above.

Figure 5:
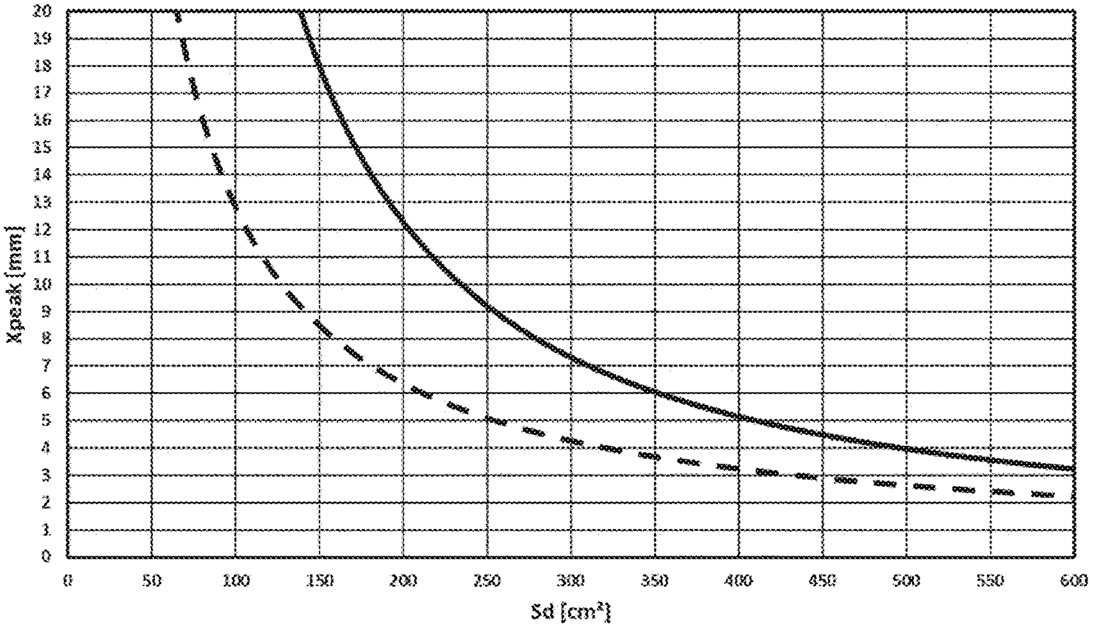
FIG. 5 shows the required radiating surface area (cm$^2$) versus peak excursion (mm in one direction) in order for a diaphragm of a dipole loudspeaker to generate 40 Hz with 110 dB for a dipole loudspeaker (solid line) and a monopole loudspeaker as measured in full space (4 pi space) in a free field condition at a listening position that is a distance of 10 cm from the diaphragm on the principal radiating axis.

FIG. 5 shows the required radiating surface area ($cm^2$) versus peak excursion (mm in one direction) in order for a diaphragm of a dipole loudspeaker to generate 40 Hz with 110 dB for a dipole loudspeaker (solid line) and a monopole loudspeaker as measured in full space (4 pi space) in a free field condition at a listening position that is a distance of 10 cm from the diaphragm on the principal radiating axis.

FIG. 5 demonstrates that with a dipole loudspeaker, a bigger diaphragm radiating area or excursion is required in order to obtain a desired SPL at the listening position, compared with an equivalent monopole loudspeaker. For example, if a peak excursion of 5 mm was chosen, this would require a radiating surface area of 400 $cm^2$ to obtain an SPL of 110 dB at the listening position.

A peak excursion of 5 mm is fairly safe, and indeed a peak excursion of 12 mm or less can be quite easily achieved in practice (although larger peak excursions are possible, harmonic distortion can become a problem at higher peak excursions). However, it can be seen from FIG. 5 that the relationship between peak excursion and diaphragm radiating surface area (to obtain a given SPL) area is non-linear, with the increase in peak excursion needed to compensate for a reduction in diaphragm radiating surface area quickly increasing as the diaphragm radiating surface area gets smaller. So, with a view to keeping peak excursion within reasonable parameters for most application, it is generally preferably to have a diaphragm with a radiating surface area that is as large as possible. For most typical applications, the radiating surface area of the diaphragm is at least 100 $cm^2$, more preferably at least 150 $cm^2$, more preferably at least 200 $cm^2$, more preferably at least 250 $cm^2$. In some cases, radiating surfaces may have a surface area of at least 300 $cm^2$, or at least 400 $cm^2$.

Figure 6:
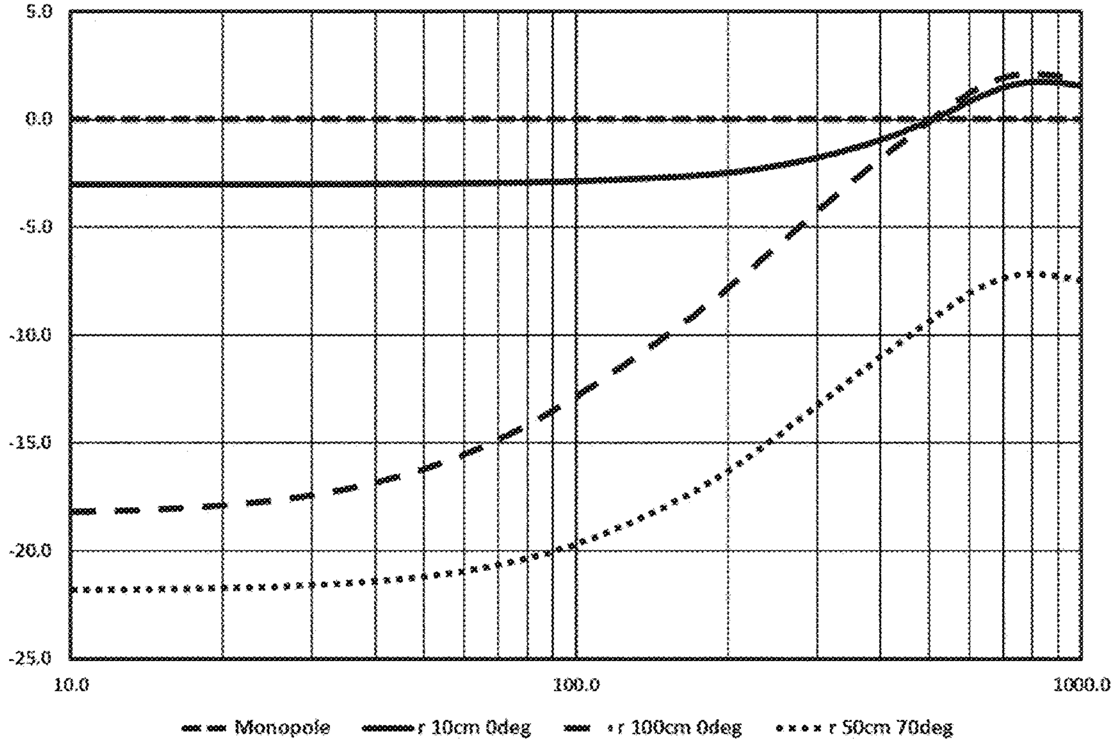
FIG. 6 shows SPL vs frequency of a dipole loudspeaker having a diaphragm with radiating area of 400 cm$^2$ (per radiating surface) and a path length D of 11.3 cm at various distances and angles relative to a principal radiating axis of the dipole loudspeaker.

FIG. 6 shows SPL vs frequency of a dipole loudspeaker having a diaphragm with radiating area of 400 $cm^2$ (per radiating surface) and a path length D of 11.3 cm at various distances and angles relative to a principal radiating axis of the dipole loudspeaker.

Figure 7:
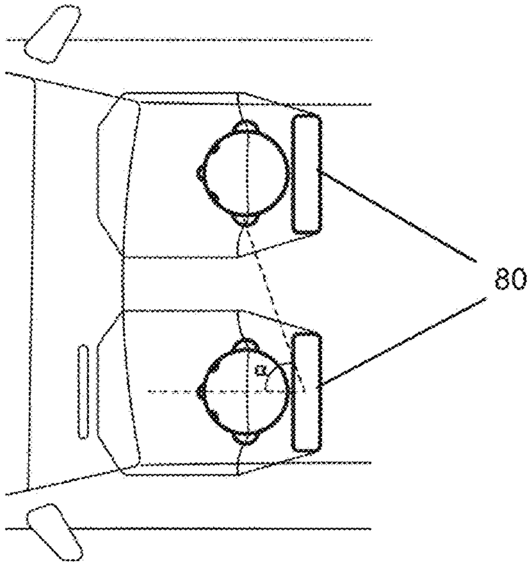
FIGS. 7-9 show a dipole loudspeaker (not visible) implementing the teaching of this disclosure as integrated into four car seat headrests.

Specifically, the solid line shows SPL vs frequency for a listening position at a distance of 10 cm on the principal radiating axis (angle=0°), the dashed line shows SPL vs frequency for a listening position at a distance of 100 cm on the principal radiating axis (angle=0°), and the dotted line shows SPL vs frequency for a listening position at a distance of 50 cm at an angle of 70° to the principal radiating axis (angle=70°), compared with an equivalent monopole (dashed flat line). Here it is to be noted that the dotted line roughly corresponds to the position of a person sat in a front passenger seat of a car relative to a loudspeaker located in the headrest of the driver seat, as illustrated by FIG. 7.

As can be seen from FIG. 6, the 400 $cm^2$ diaphragm has $f_{equal}$=500 Hz, meaning that compared to a dipole there is no advantage in creating a personal sound cocoon on-axis (angle=0°) above 500 Hz compared to an equivalent monopole. The cosine polar response of a dipole loudspeaker is however maintained so even at frequencies above 500 Hz, there is still advantageous sound cancelation off-axis.

The upper frequency range of a dipole loudspeaker designed according to the teaching herein may be limited according to these considerations. For example, if it is desired that SPL be adequately low outside the personal sound cocoon, it may be desirable to limit the frequencies to be considerably below $f_{equal}$ in order to benefit from cancellation achieved by using a dipole loudspeaker. For example, it may be desirable to drive the dipole loudspeaker at frequencies that do not exceed one octave below $f_{equal}$ (one octave below $f_{equal}$ is 250 Hz in this example), or at frequencies that do not exceed two octaves below $f_{equal}$ (two octaves below $f_{equal}$ is 125 Hz in this example).

Note here that also the well-known equal-loudness contours [1] show that the response to bass frequencies of the human ear is beneficial for creating a personal sound cocoon at very low frequencies, but helps less and less the higher we go in the frequency spectrum.

Harmonic distortion is another consideration that may be taken into account when implementing the technology described herein. As is known in the art, loudspeaker harmonics are multiples of a fundamental frequency that occur due to non-linearities that are present in the driving force moving the diaphragm and in the suspension of the diaphragm. Since those multiple frequencies would typically lie outside the frequency range of a subwoofer, it is thought desirable to keep those distortion values to a minimum. This is because any loudspeaker harmonics that are created would have higher frequencies than the preferred frequency ranges of a subwoofer, and at such frequencies the noise produced by such harmonics would benefit much less from the "cocooning" effects discussed above, and could therefore be heard outside of the personal sound cocoon. Similar considerations are valid for rub and buzz noises, since those have a broadband spectrum, therefore cracking noises from spiders, or blowing noises from motor system should be avoided since they too could be heard outside of the personal sound cocoon. Moreover, distortion and rub noises may also be very audible to a listener inside the personal sound cocoon, since that listener would be situated very close to the loudspeaker and therefore such noises could jeopardize the purity of bass that a user might hear. Small rub and buzz noises therefore that might not be heard outside the cocoon could still jeopardize the experience of a listener. When listening to traditional loudspeakers at a more conventional greater distance such noises might be less disturbing, since at greater distance the level of those noises will be sufficiently reduced and therefore more easily masked by the undistorted sound produced by the loudspeaker. Since in the applications described herein a listener may be positioned very close to the loudspeaker, the masking of those noises may be less as compared with more traditional listening arrangements.

For these reasons, an implementation of the technology described herein preferably uses a low-distortion loudspeaker with a view to avoiding harmonic distortion, rub and buzz noises. Low-distortion loudspeakers can be made according to well-known techniques (longer voice coil, more magnetic material) albeit these techniques tend to result in a more expensive loudspeaker.

Further, it is preferable that a dipole loudspeaker implementing the techniques described herein has a resonance frequency (Fs) below the frequency range over which the loudspeaker is to be driven, with a view to optimizing its efficiency at low frequencies. Note that below Fs the diaphragm would not be mass controlled anymore and would show an extra 12 dB/octave reduced output.

The above concepts may be summarised by the following logic:

The human ear's low sensitivity to low frequencies implies a high SPL required for low frequencies at the human ear A high SPL required at the human ear requires a large dipole size A large dipole size results in a large path length D A large path length D causes $f_{equal}$ to be lowered A lowered $f_{equal}$ limits the upper frequency at which a personal sound cocoon can be effectively produced A limited upper frequency range means that the concepts taught herein are most applicable to bass frequencies and suggest that low distortion components should be used.

Figure 24:
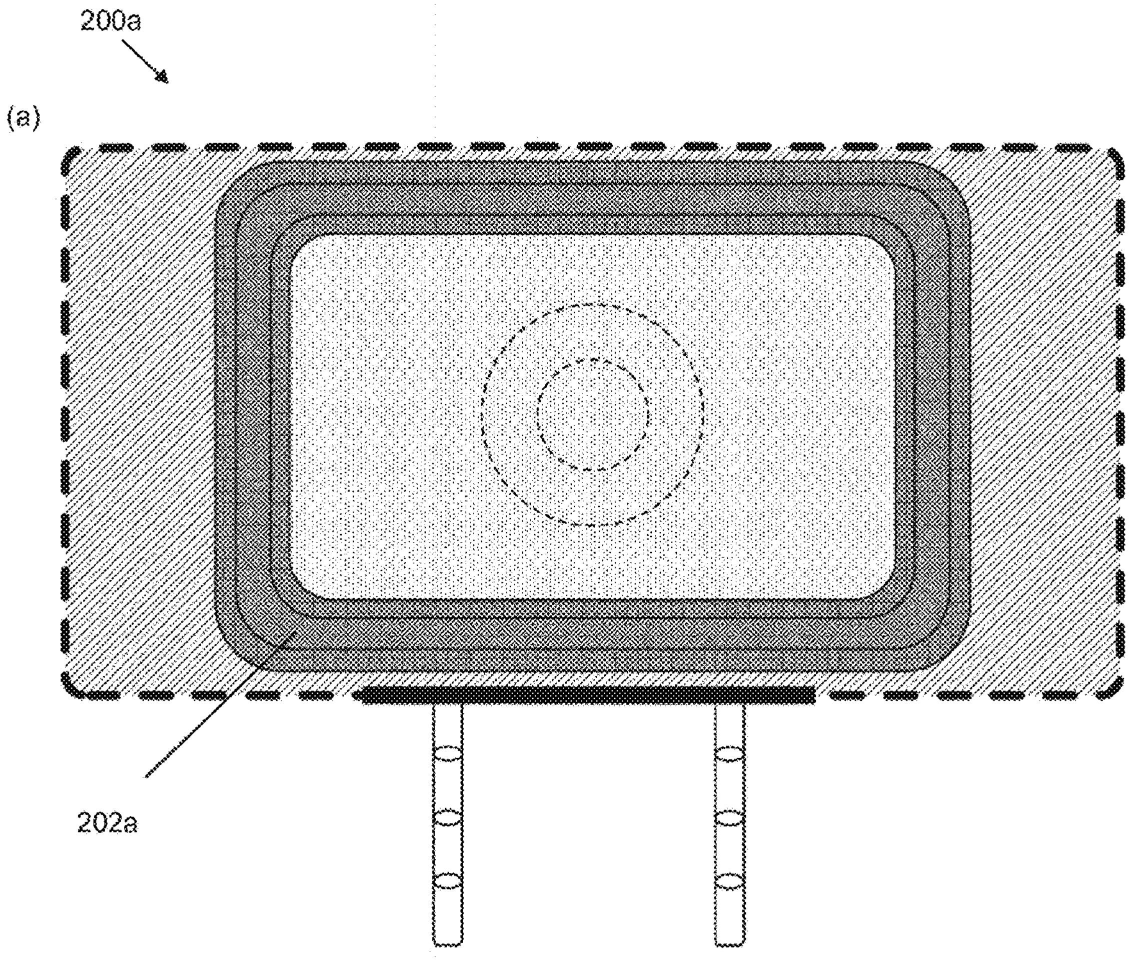
FIGS. 24A to 24B illustrate a second set of examples implementing the teaching of this disclosure.
Figure 24:
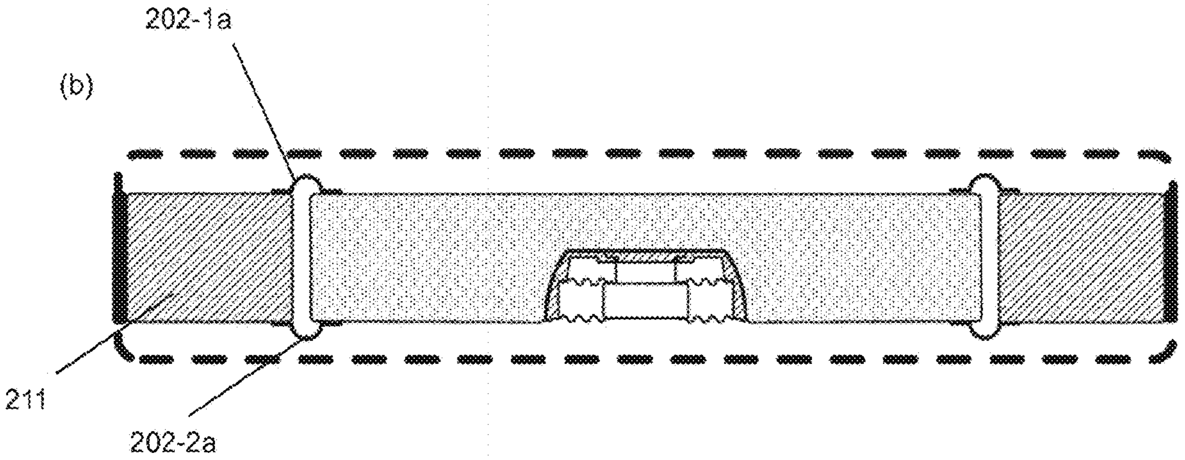

As can be seen from the above discussions, path length D may be another consideration taken into account when implementing a loudspeaker according to the present disclosure. Below, we describe some implementations where the path length D can be tuned independently from the diaphragm's size, with reference to FIG. 20, FIG. 21 and FIG. 24.

Further considerations associated with implementing a loudspeaker according to the present disclosure may involve incorporating acoustic resistance into the shell around our dipole loudspeaker, e.g. to shape the polar response and thus the shape of the resulting personal sound cocoon. For example, adding absorption material or reducing the openness of the shell's perforations on the backside may help to obtain a more cardioid polar response.

What now follows is a discussion of various non-limiting examples of possible implementations of a dipole loudspeaker according to the present disclosure, as implemented in one or more headrests of a car seat.

Figure 8:
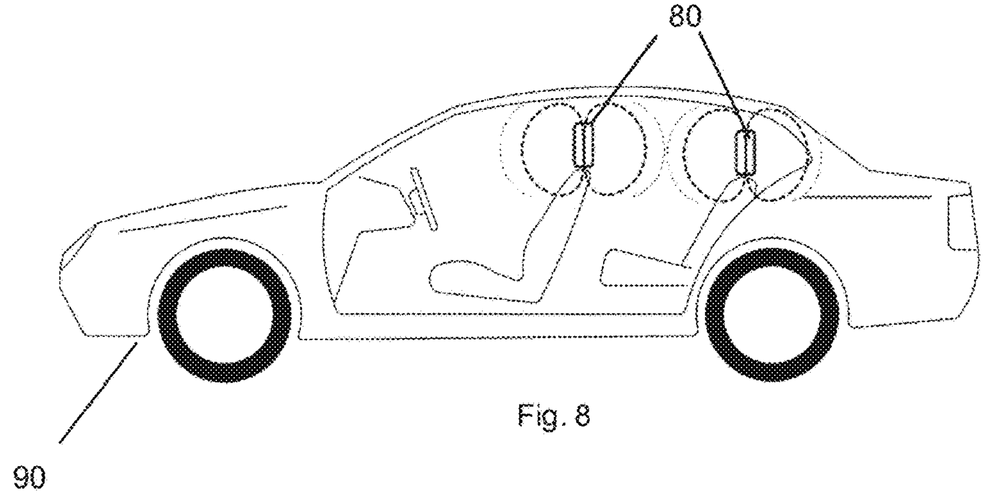
Figure 9:
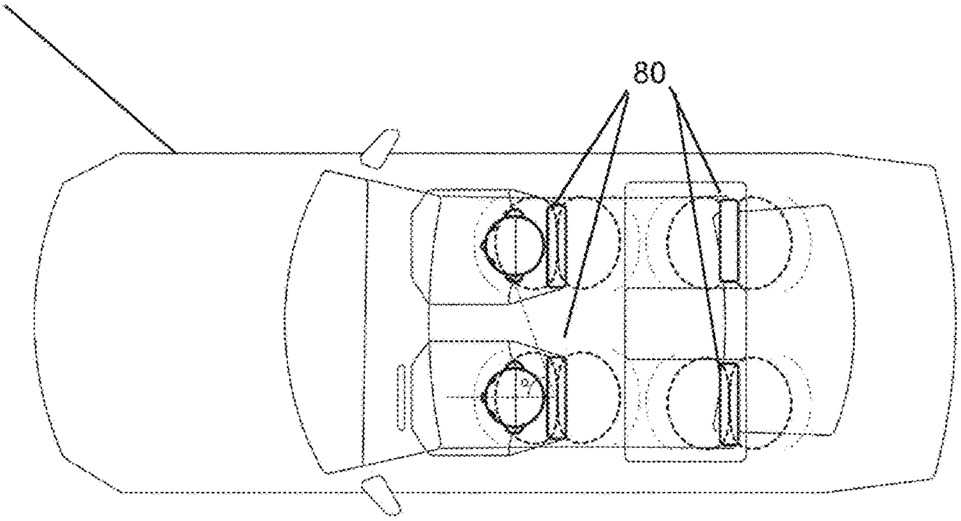

FIGS. 7-9 show a dipole loudspeaker (not visible) implementing the teaching of this disclosure as integrated into four seat headrests 80 of a car 90.

In this example, a respective dipole loudspeaker is incorporated into a respective headrest of each of two front seats (driver seat and passenger seat) and two back seats. The polar SPL response of a personal sound cocoon created by each loudspeaker is shown by dotted lines in FIGS. 8 and 9.

Owing to dipole loudspeakers being used, it is notable that a personal sound cocoon is created in both forwards and backwards directions, though in this implementation only the forward-facing personal sound cocoons are relevant, since the head of a passenger will in general not be located in the rearward-facing personal sound cocoons.

FIG. 7 shows the ear of a person sat in the front passenger seat at a distance of ~50 cm and an angle $\alpha=70°$ to the principal radiating axis of a loudspeaker relative to the dipole loudspeaker located in the headrest of the driver seat. From this, it can be seen that the dotted line in FIG. 6 approximates the SPL as received by a person sat in the passenger seat from a loudspeaker located in the headrest of a driver seat of the same car.

In a simple form, a traditional single round cone loudspeaker could be implemented in a headrest to act naturally as a dipole. However as explained above, a desire to maximize the surface area of the first and second radiating surface within the boundaries of a suitable headrest design may lead to consideration of non-circular e.g. rectangular or irregular diaphragm shapes. Using a non-circular diaphragm may have a knock-on effect on the suspension elements used to suspend the diaphragm. In general, a roll suspension works best when executed as a straight element or a circular element, so bending the roll edge so that it follows the corners/curved edge(s) of a non-circular diaphragm may impact on its performance (increased friction and different stiffness moving inward vs outward). For this reason, a symmetric execution of the dipole's diaphragm suspension (same on both radiating surfaces of the diaphragm) may be considered so that any asymmetry is cancelled. For rectangular diaphragms having relative sharp corners, a continuous roll suspension following its contours would imply small radii of the roll suspension in the corners hence jeopardizing fluent movement, so diaphragm corners with large radii of curvature may be considered. Since there is no need to seal the pressure from our diaphragm into a housing (because the diaphragm is being used as a dipole) use of only straight pieces of roll suspension whilst leaving corners free may also be considered. A roll suspension made from coated textile may be considered for weight saving and stability of movement. Other suitable materials may include rubber and foam.

Further the dipole loudspeaker construction may be designed to be slim to fit in acceptable headrest designs and ergonomics. Therefore, in some of the examples described below allow for a "cut-out" in the diaphragm where one or more supporting elements of a frame extend through the cut out to hold a magnet unit of the drive unit in front of a radiating surface of the diaphragm (see e.g. FIG. 10).

In another practical implementation, a magnet unit of the drive unit may be suspended from the diaphragm itself, thus saving weight, see e.g. FIG. 22.

Another consideration to be considered when implementing the present disclosure is the extent to which vibrations from the diaphragm's mass acceleration are to be filtered out, e.g. so that these vibrations are not transmitted to the seat on which the headrest is mounted. Unless someone would like to use residual vibrations from our dipole to establish a tactile effect, those mechanical vibrations are most of the time unwanted since they could distract from a "pure bass" experience. For this reason, the use of an electrical high pass filter set to allow frequencies to pass above the tuning frequency of the mechanical filter resulting from the mass spring assembly provided by the loudspeaker (e.g. in FIG. 10E the element Ca will provide a mechanical filter in combination with the other masses) and below the frequency range at which the loudspeaker is to be driven may be considered. Setting such frequencies is well within the competence of a skilled person and therefore does not need to be described in further detail herein.

Automotive safety requirements include crash impact validation. Our acoustic requirements may lead to a relatively heavy motor system being used to drive the diaphragm of a dipole loudspeaker. If incorporated into a headrest, measures may need to be taken to prevent any heavy elements of the loudspeaker (e.g. steel incorporated into a magnet unit) from reaching a user's head during a crash event. A possible implementation for achieving this is considered below, see e.g. FIG. 10.

The following discussion sets out loudspeakers which mounted within a headrest of a car seat. These examples are divided into a first set of examples and a second set of examples.

First Set of Examples

In a first set of examples, the frame from which the diaphragm is suspended is a first frame, wherein the diaphragm is suspended from the first frame via one or more primary suspension elements, and wherein the first frame is suspended from a second frame via one or more secondary suspension elements.

Figure 10A:
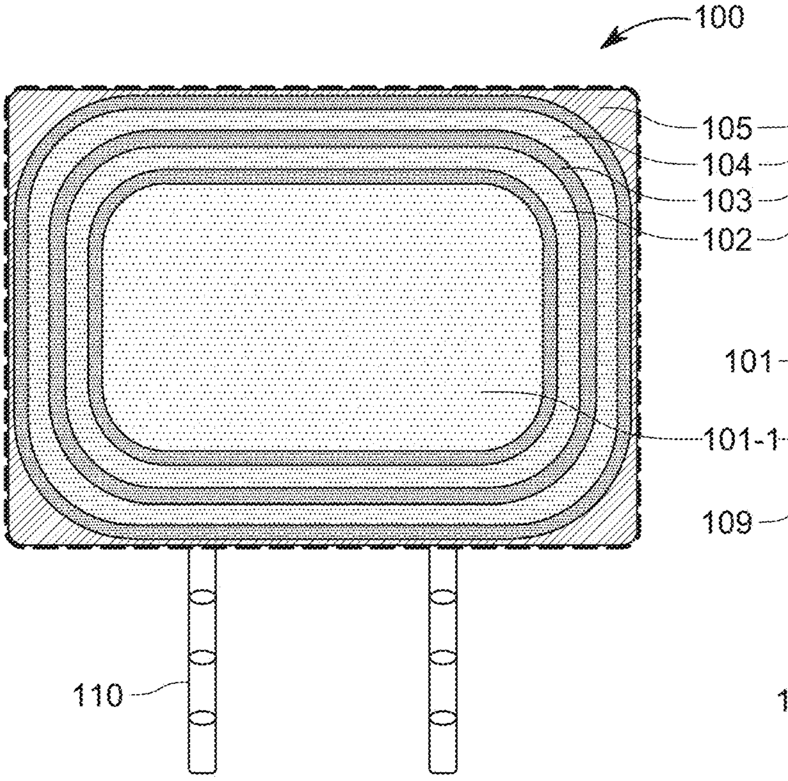
FIGS. 10A to 10E illustrate a first set of examples implementing the teaching of this disclosure.
Figure 10B:
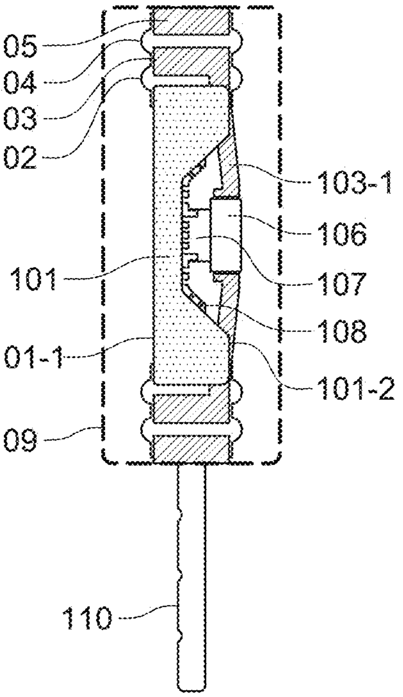
Figure 10C:
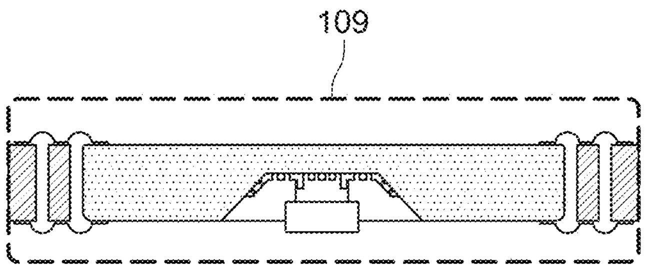

FIGS. 10A-10C show a first example loudspeaker 100 from the first set of examples. As shown in FIGS. 10A-10C, the loudspeaker 100 has a diaphragm 101 having a first radiating surface 101-1 ("front face", which faces towards a passenger seated in a seat that incorporates the headrest) and a second radiating surface 101-2 ("back face", which faces away from a passenger seated in a seat that incorporates the headrest). In this example, the diaphragm 101 is of extruded polystyrene foam or similar, and may optionally be reinforced with a surface skin (not shown).

The diaphragm 101 is suspended from a first frame 103 via a primary suspension element 102. The first frame 103 is suspended from a second frame 105 via a secondary suspension element 104. The second frame is rigidly attached to mounting legs 110, which are themselves part of a car seat frame.

In this example, each of the primary suspension element 102 and the secondary suspension element 104 is a roll suspension that extends continuously around the edge of the diaphragm 101. In other examples, the continuous roll suspension of the primary suspension element 102 and/or secondary suspension element 104 may be replaced with multiple roll suspensions which extend non-continuously around the edge of the diaphragm 101. A benefit of using a continuous roll suspension for the primary suspension element 102, and optionally the second suspension element 104, is that doing so increases path length D. The radius of curvature of the corners in the roll suspensions as they extend around the corners of the diaphragm are deliberately kept rather large in this example.

The loudspeaker 100 also has an electromagnetic drive unit that includes a magnet unit 106 that configured to produce a magnetic field, and a voice coil 107 attached to the diaphragm via a voice coil coupler 108.

The first frame 103 includes rigid supporting arms 103-1 configured to hold the magnet unit 106 in front of the second radiating surface 101-2 of the diaphragm 101.

In this example, the voice coil coupler 108 is an element which attaches the voice coil 107 to the second radiating surface 101-2 of the diaphragm 101. In this example, the voice coil coupler is glued to both the voice coil 107 and the diaphragm 101 (thereby attaching the diaphragm 101 to the voice coil 107), and includes lots of holes to facilitate gluing. The voice coil coupler 108 may be configured to prevent magnet from passing through diaphragm in the event of a crash. Because the voice coil coupler 108 attaches the voice coil 107 to the second radiating surface 101-2 of the diaphragm 101, the diaphragm 101 does not require a dustcap on the first radiating surface 101-1.

Figure 10D:
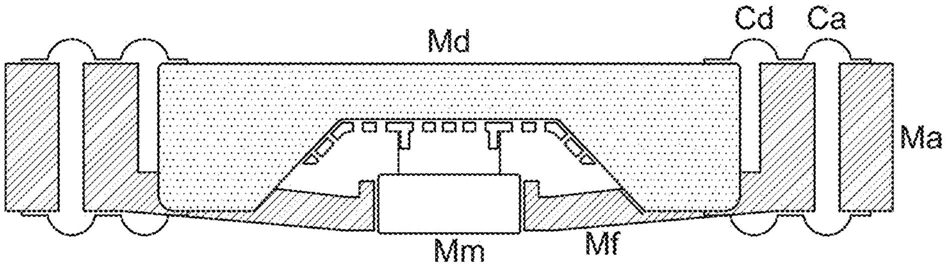
Figure 10E:
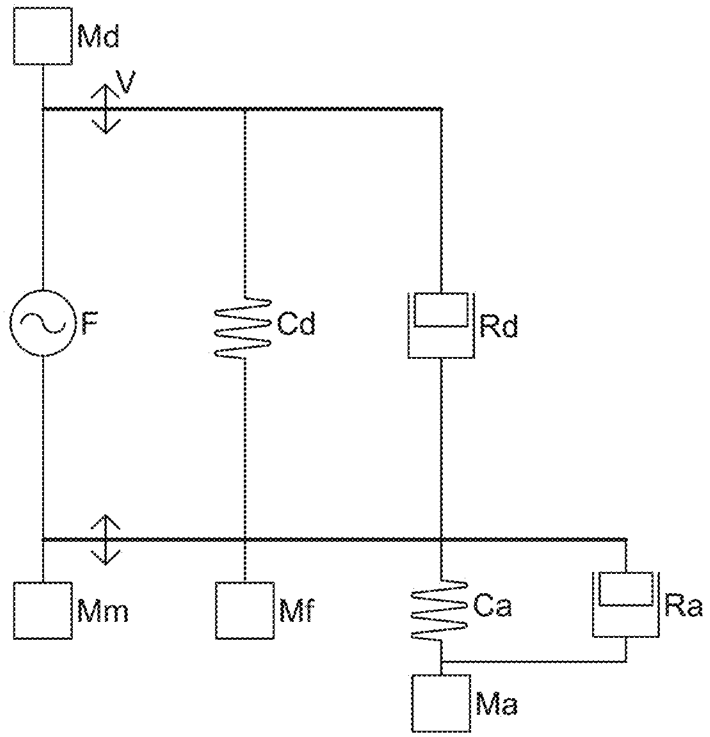

The voice coil coupler 108 may be made e.g. of plastic. For example, the voice coil coupler 108 could be made of acrylonitrile butadiene styrene ("ABS"), polycarbonate ("PC"), or polyvinyl chloride ("PVC") and may be filled with (e.g. 20%) glass fibres to improve structural strength. Plastic is preferred over other materials (e.g. metal) since it is typically lighter, thereby helping to keep down the moving mass of the loudspeaker. The loudspeaker 100 also includes an acoustically transparent shell 109 or headrest framework suitable to be covered with an acoustically transparent finishing material. FIGS. 10D-10E show masses and compliances presented in a mechanical analogy of the loudspeaker 100.

In FIGS. 10D-10E, the following notation is used:

Md: mass of diaphragm 101

Mm: mass of magnet unit 106

Mf: mass of first frame 103

Ma: mass of the "application" (=mass of second frame 105, and the structure to which the second frame 105 is rigidly attached, which in this case is the car set via mounting legs 110 and the car seat frame)

Cd: compliance of the primary suspension element 102

Ca: compliance of secondary suspension element 104

Rd: mechanical friction (losses) of Cd

Ra: mechanical friction (losses) of Ca

Example mass/compliance distribution of the loudspeaker 100:

| | |
|---|---|
| Md: 82 g (including airload) | Ca: 2 mm/N |
| Mm: 420 g | Re: 7.2 ohm |
| Mf: 500 g | Bl: 9N/A |
| Ma: 1 kg (arbitrary) | Sd: 540 $cm^2$ |
| Cd: 1 mm/N | D: 15 cm |

Figure 11:
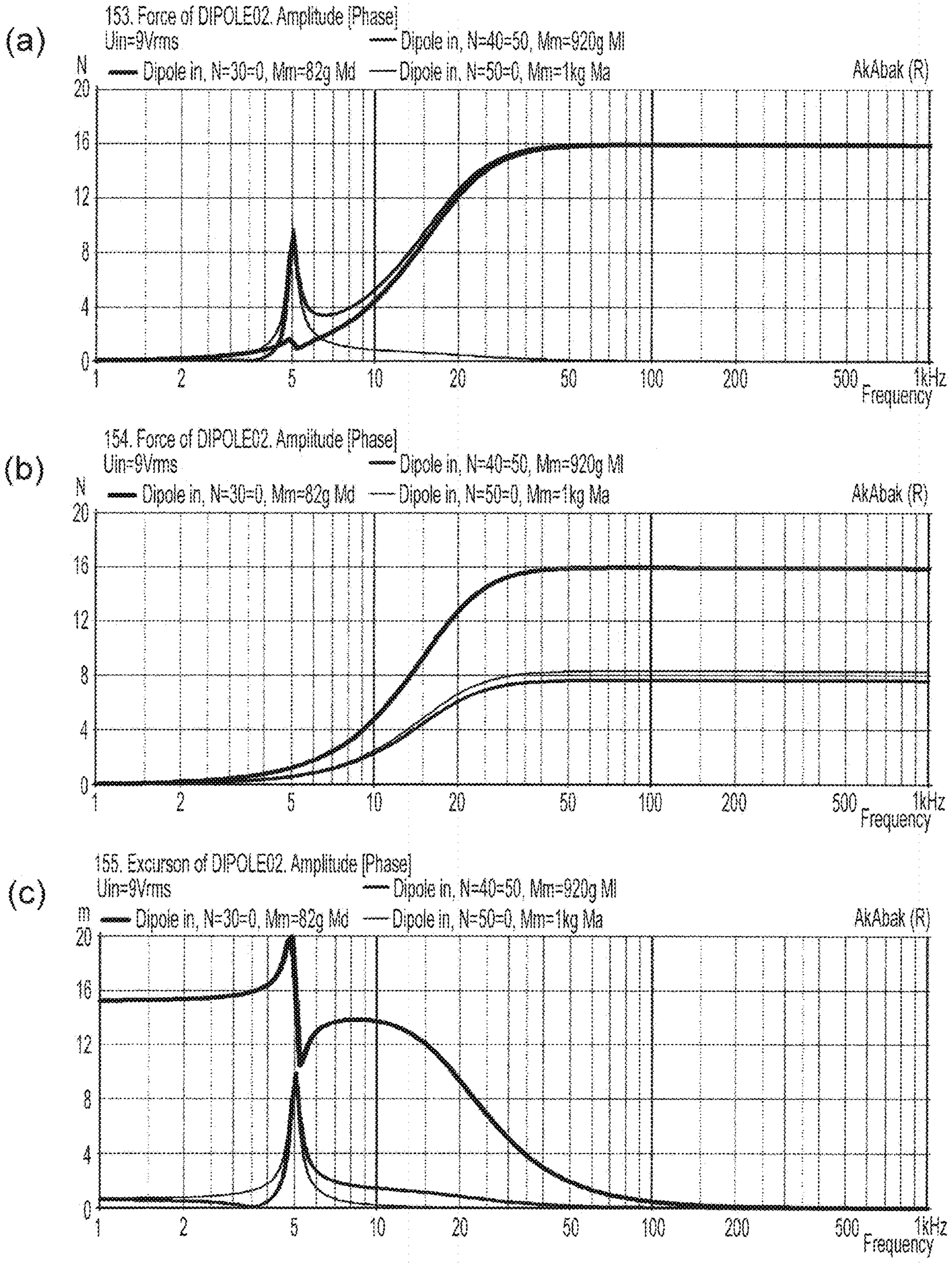
FIGS. 11A to 11C illustrate a first set of examples implementing the teaching of this disclosure.

FIG. 11A shows the force profile for the loudspeaker 100 shown in FIGS. 10A-10E, where the thick curve shows peak force acting on Md (diaphragm 101), the medium curve shows peak force acting on Mm+Mf (magnet unit 106 and first frame 103), and the thin curve shows peak force acting on Ma ("application").

Note that the secondary suspension element 104 has been tuned at 5 Hz, well below the frequency spectrum over which the loudspeaker 100 is intended to operate, thereby effectively limiting the residual force on the "application".

FIG. 11B shows the force profile for the loudspeaker 100 shown in FIGS. 10A-10E, where the secondary suspension element 104 has been replaced with an infinitely stiff element (thereby eliminating the benefit of the second frame 105 and secondary suspension element 104)

FIG. 11C shows the excursion profile for the loudspeaker 100 shown in FIGS. 10A-10E, where the thick curve shows the peak excursion of the diaphragm Md, the medium curve shows the peak excursion of the frame and motor Mm+Mf, and the thin curve shows the peak excursion of the application. The secondary suspension element 104 was present in its intended form (resilient, rather than infinitely stiff) for the purposes of FIG. 11B.

Figure 13:
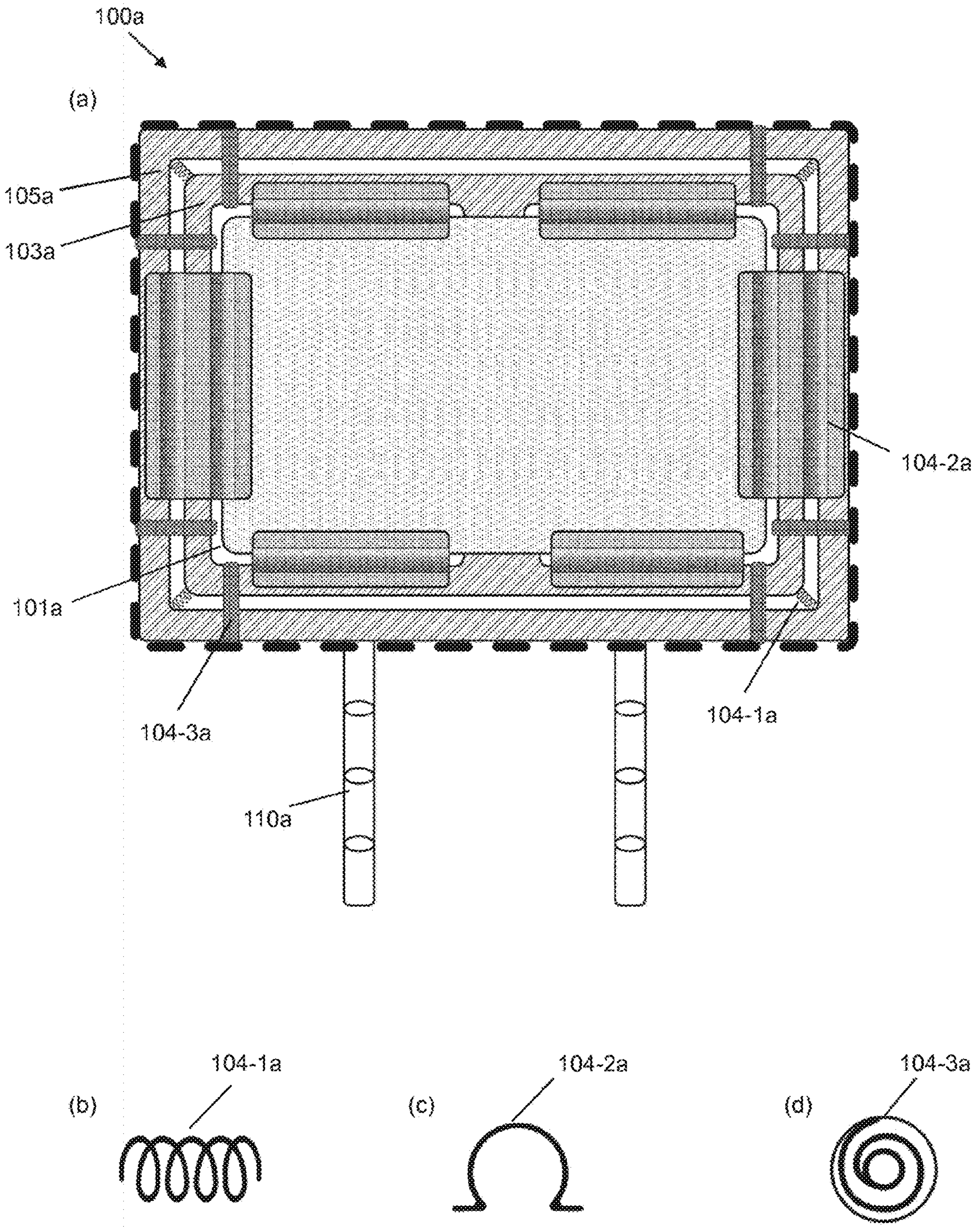
FIGS. 13A to 13D illustrate a first set of examples implementing the teaching of this disclosure.

FIG. 11C shows there are limited excursion requirements for the secondary suspension element 104 (see medium curve), meaning that the secondary suspension element 104 doesn't need to permit much movement. This creates other spring options for the secondary suspension element 104, as described below with reference to FIG. 13.

The curves (peak force and peak excursion) are caused by applying a 9 Vrms signal onto the voice coil 107 for the frequencies shown (which can be achieved by applying a sinusoidal sweep starting from 1 Hz to 1 kHz). In this way the system will be actuated by the forces generated by voice coil 107—magnet unit 106 interaction. Note that 9 Vrms is a typical maximum voltage a standard automotive amplifier will be able to deliver with a 12V car battery when no voltage upscaling circuits are used.

Figure 12:
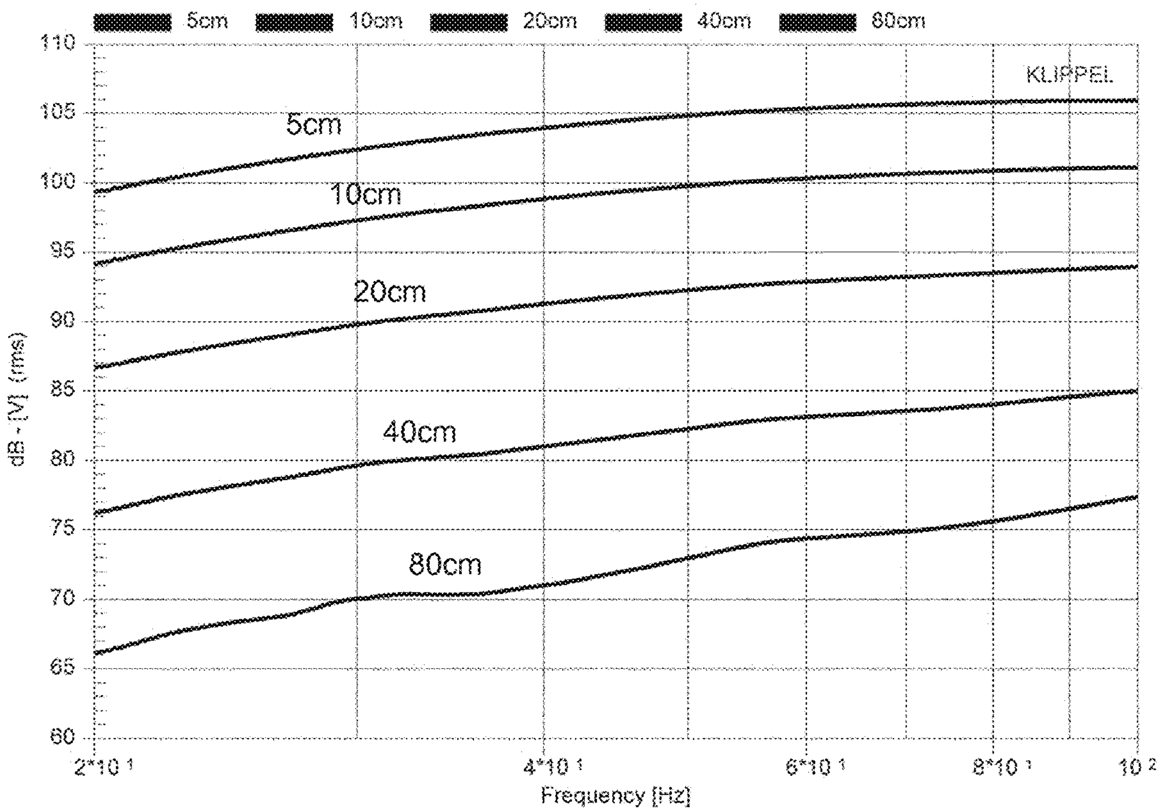
FIG. 12 illustrates a first set of examples implementing the teaching of this disclosure.

FIG. 12 shows absolute SPL as measured on axis (on the principal radiating axis) with 1 W electric power at different distances from a first radiating surface 101-1 of the loudspeaker 100, where the first radiating surface 101-1 of the loudspeaker has a surface area of 540 $cm^2$, with Md of 82 g and Bl=11.88 Tm. Here it is to be noted that e.g. at 40 Hz, there is a drop of 28 dB when moving from a 10 cm listening position to an 80 cm listening position.

FIGS. 13-21 show further example loudspeakers from the first set of examples. Alike features have been given corresponding reference numerals and have not been described in further detail, except where this provides additional insight.

FIG. 13A shows a second example loudspeaker 100*a* from the first set of examples. In this example, some other spring options are used for the secondary suspension element 104*a*.

In the illustrated example, the diaphragm 101*a* is suspended from the first frame 103*a* by a plurality of primary suspension elements 102*a*, each of which is a straight roll suspension.

Since, as noted above, the secondary suspension element 104 of the loudspeaker 100 didn't need to permit much movement, in this example the first frame 103*a* is suspended from the second frame 105*a* by a plurality of secondary suspension elements 104*a*, which include metal springs 104-1*a* as depicted in FIG. 13B, straight roll suspensions 104-2*a* as depicted in FIG. 13C and elastic rubber bands 104-3*a* as depicted in FIG. 13D. The roll suspensions 104-2*a* add little stiffness but act to hold the complete mass of the loudspeaker 100 except for the second frame 105*a* in the vertical plane.

A possible reason for using metal springs of all possible shapes in the context of suspending the first frame 103*a* from the second frame 105*a* is for improved durability and providing better restoring force compared to a roll suspension, so to keep the loudspeaker frame in position relative to the second frame/headrest chassis. Note that the second suspension is holding the complete mass of the loudspeaker, which is much more than the primary suspension (which is just holding the diaphragm 101*a*). Elastic rubber can also be added to keep the flexible suspended masses in position by providing a restoring force.

Figure 14:
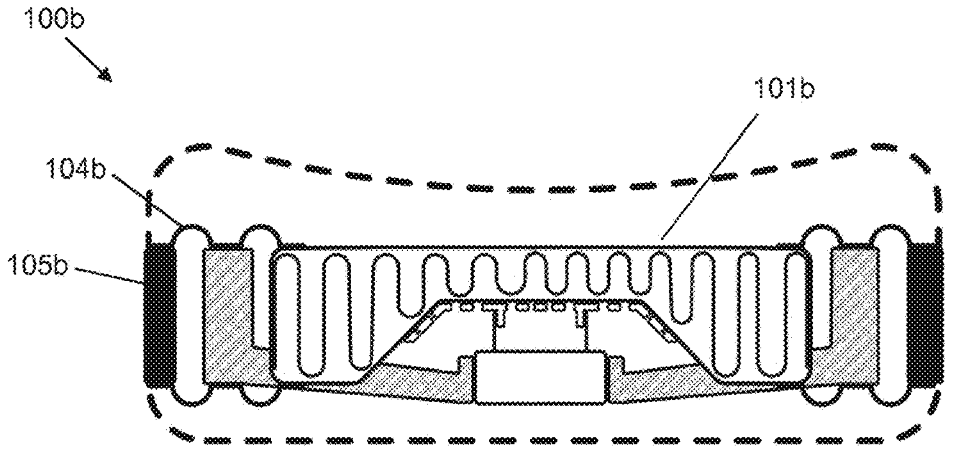
FIGS. 14-16 illustrate a first set of examples implementing the teaching of this disclosure.

FIG. 14 shows a third example loudspeaker 100*b* from the first set of examples. In this example, the secondary suspension element 104*b* is directly mounted to a framework of the headrest, which acts as the second frame 105*b* in this example. In other words, the loudspeaker doesn't have a dedicated second frame in this example. In this example, the diaphragm 101*b* is made of cardboard, as indicated by the illustrated corrugations therein.

Figure 15:
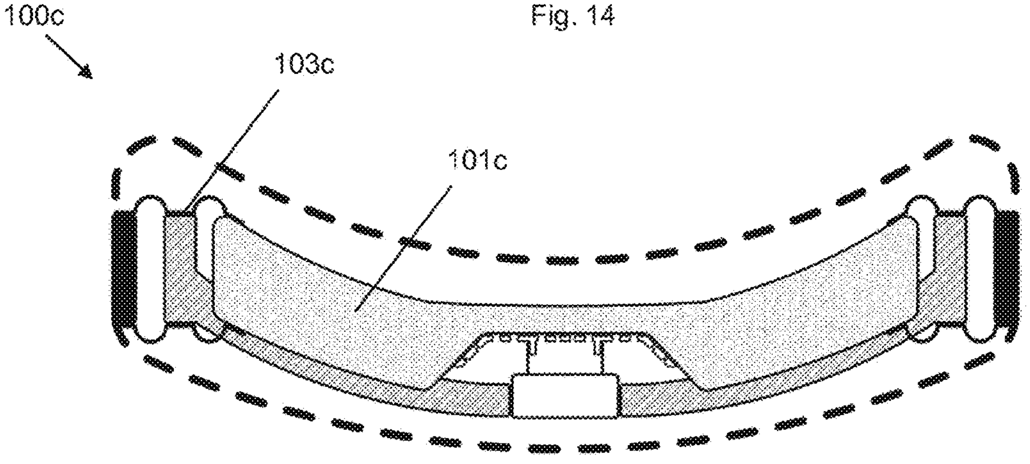

FIG. 15 shows a fourth example loudspeaker 100*c* from the first set of examples. In this example, the diaphragm 101*c* and first frame 103*c* are curved with respect to an axis that is perpendicular to a diaphragm axis along which the drive unit is configured to move the diaphragm.

Figure 16:
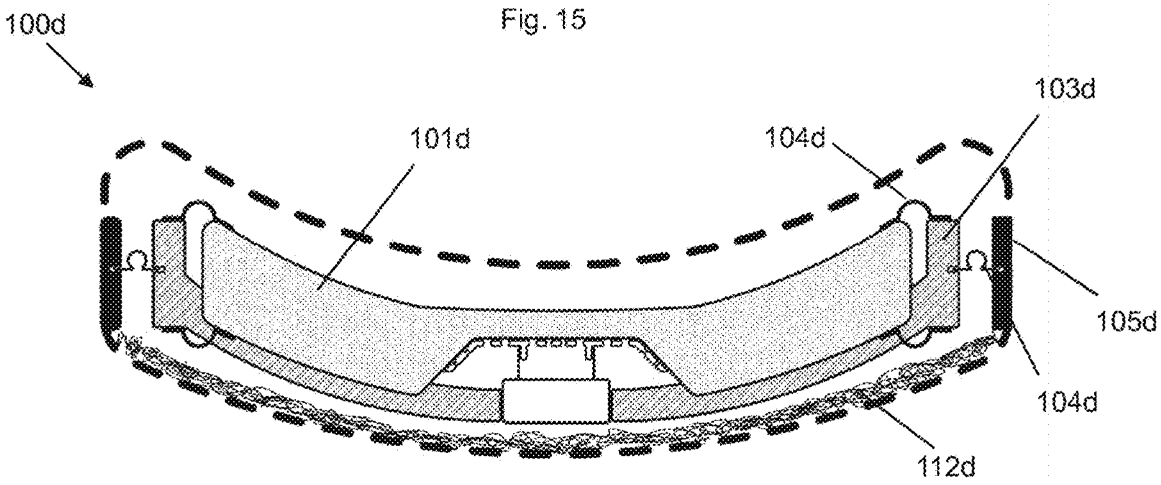
Figure 17:
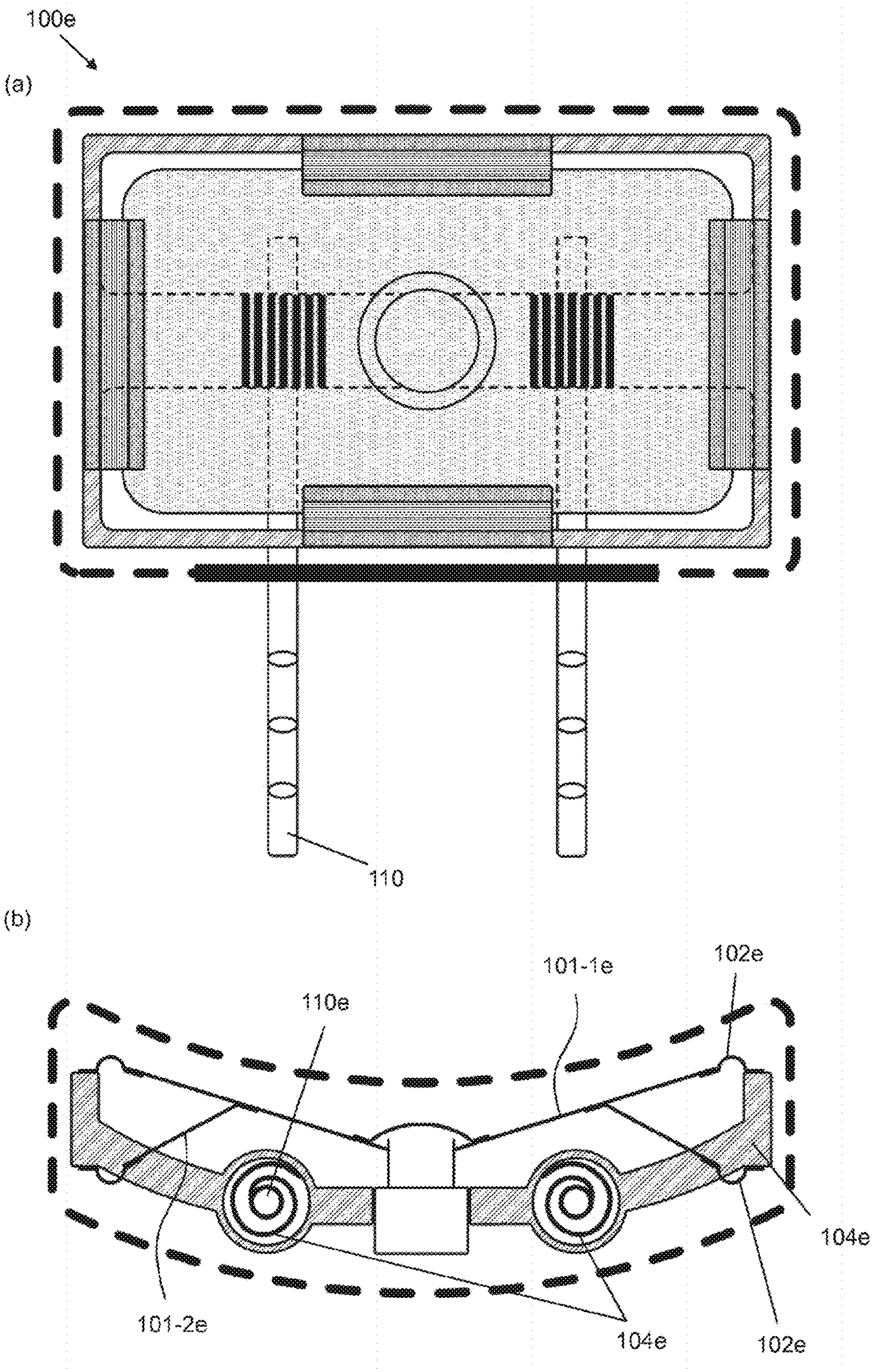
FIGS. 17A to 17B illustrate a first set of examples implementing the teaching of this disclosure.

FIG. 16 shows a fifth example loudspeaker 100*d* from the first set of examples. In this example, metal springs act as a plurality of secondary suspension elements 104*d* which suspend the first frame 103*d* from the second frame 105*d*. Absorption material 112*d* has also been added to influence the directivity pattern of the loudspeaker 100*d*.

FIGS. 17A-17B show a sixth example loudspeaker 100*e* from the first set of examples. In this example, the diaphragm 101*e* is a combination of cones including a first cone (which provides a first radiating surface 101-1*e*) and a second cone (which provides a second radiating surface 101-2*e*) which is interrupted with cut-outs for passage of the rigid supporting arms 103-1*e* of the first frame 103*e*. Both the first cone and the second cone of the diaphragm are suspended from the first frame by roll suspensions, which act as the primary suspension elements 102*e*.

The first cone and second cone may be made of paper, and may help to provide a lighter diaphragm 101*e* compared with other implementations which use a polystyrene diaphragm, thereby reducing the total moving mass of the loudspeaker In this example, the first frame 103*e* is suspended from mounting legs 110*e* of the car seat frame via metal springs. Here, the mounting legs 110*e* act as the second frame of the loudspeaker 100*e*, and the metal springs act as the secondary suspension elements 104*e*.

Figure 18:
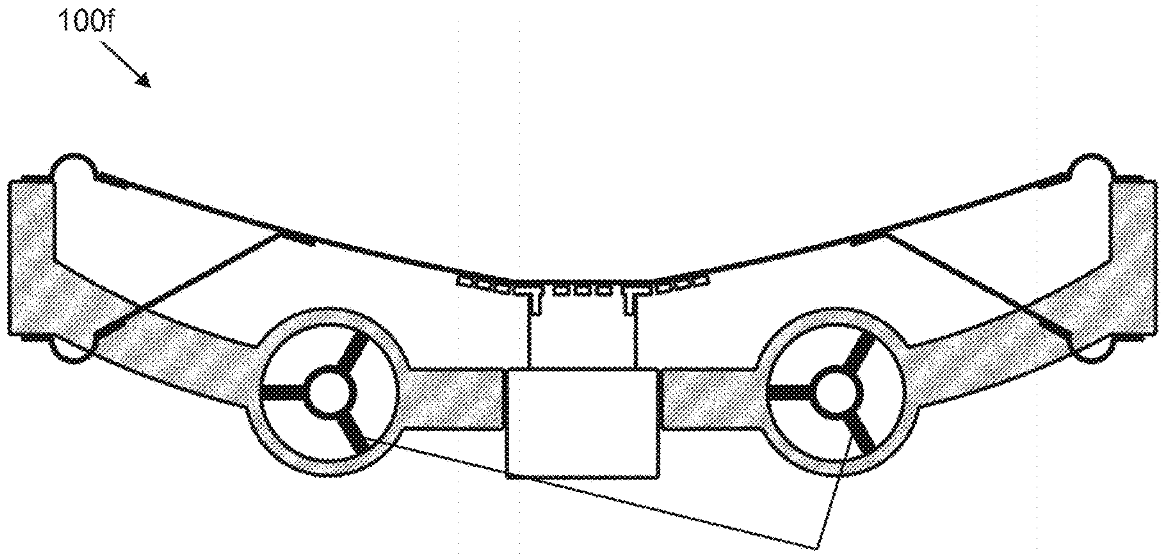
FIGS. 18-21 illustrate a first set of examples implementing the teaching of this disclosure.

FIG. 18 shows a seventh example loudspeaker 100*f* from the first set of examples. This example is similar to that depicted in FIGS. 17A-17B, except that the metal springs are replaced by elastic suspensions which act as the secondary suspension elements 104*f*.

Figure 19:
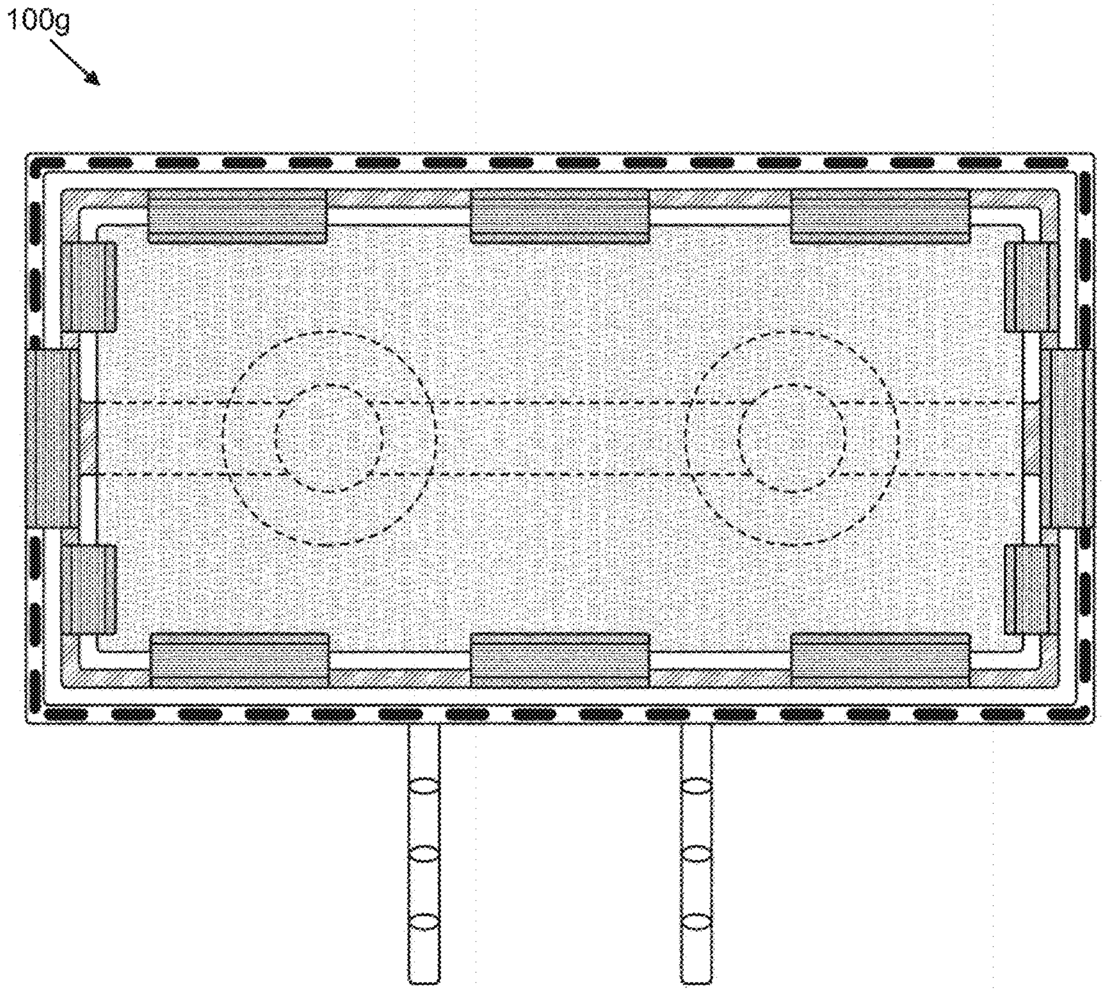

FIG. 19 shows an eighth example loudspeaker 100*g* from the first set of examples. This example illustrates a dual drive option in which there are two magnet units and two voice coils, and two voice coil couplers.

Figure 20:
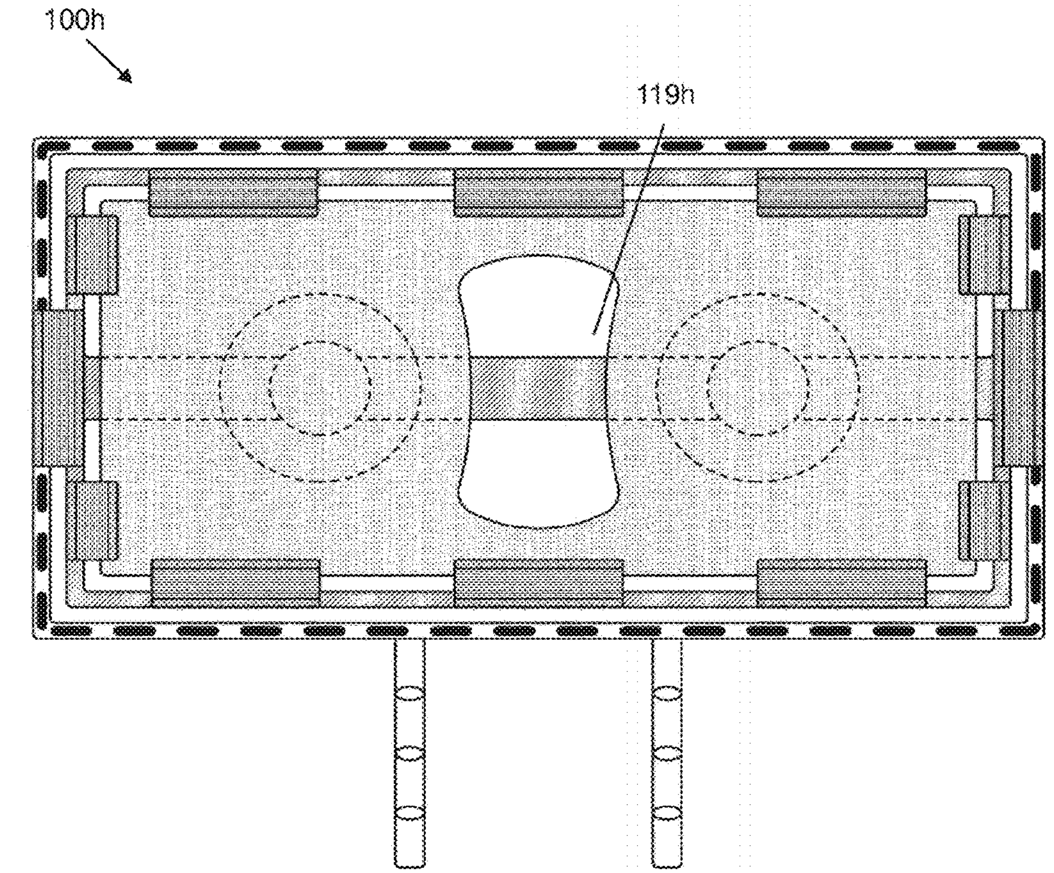

FIG. 20 shows a ninth example loudspeaker 100*h* from the first set of examples. This example is similar to that depicted in FIG. 19, except that the path length D of the loudspeaker is reduced by adding a "path length tuning opening" 119*h* in the diaphragm 101*h*.

Figure 21:
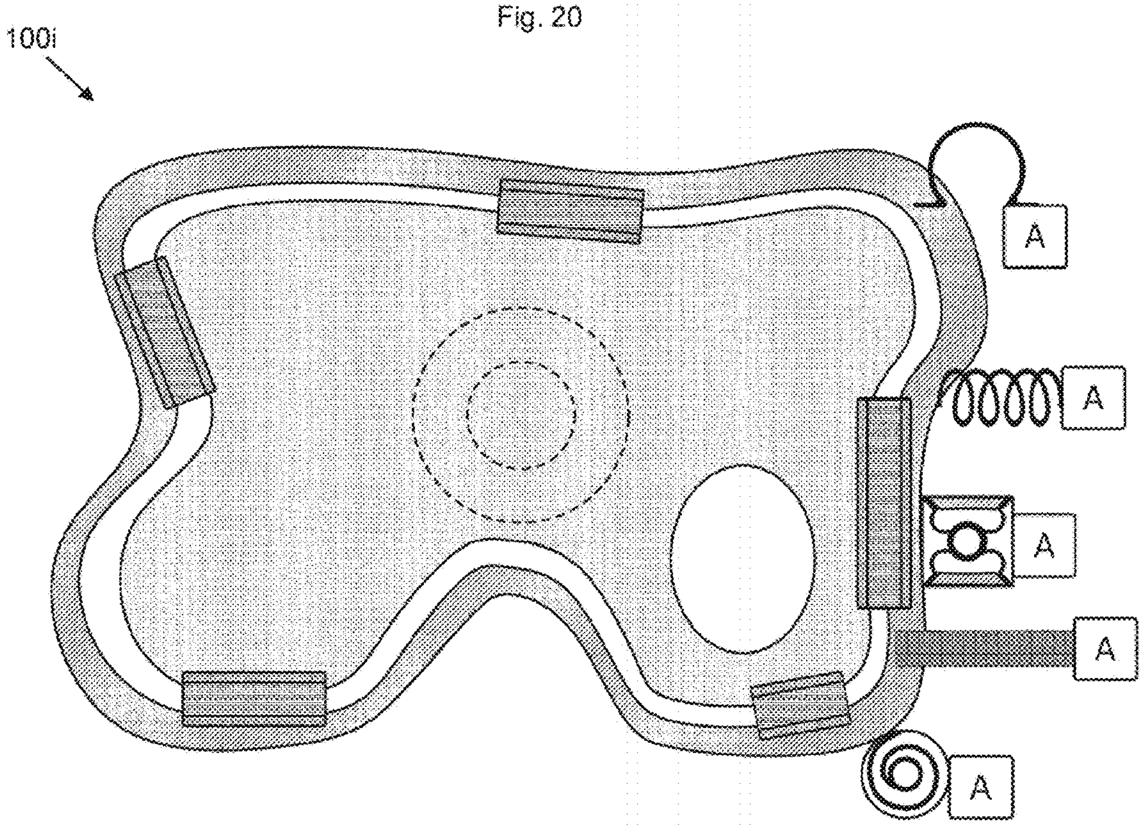

FIG. 21 shows a tenth example loudspeaker 100*i* from the first set of examples. This example shows a diaphragm having a non-uniform shape, demonstrating that the techniques described herein can be implemented with a variety of geometrical freedoms, and with a variety of suspension elements.

Second Set of Examples

In a second set of examples, the frame from which the diaphragm is suspended is part of or configured to fixedly attach to, a rigid supporting structure, such as a car seat frame.

Figure 22A:
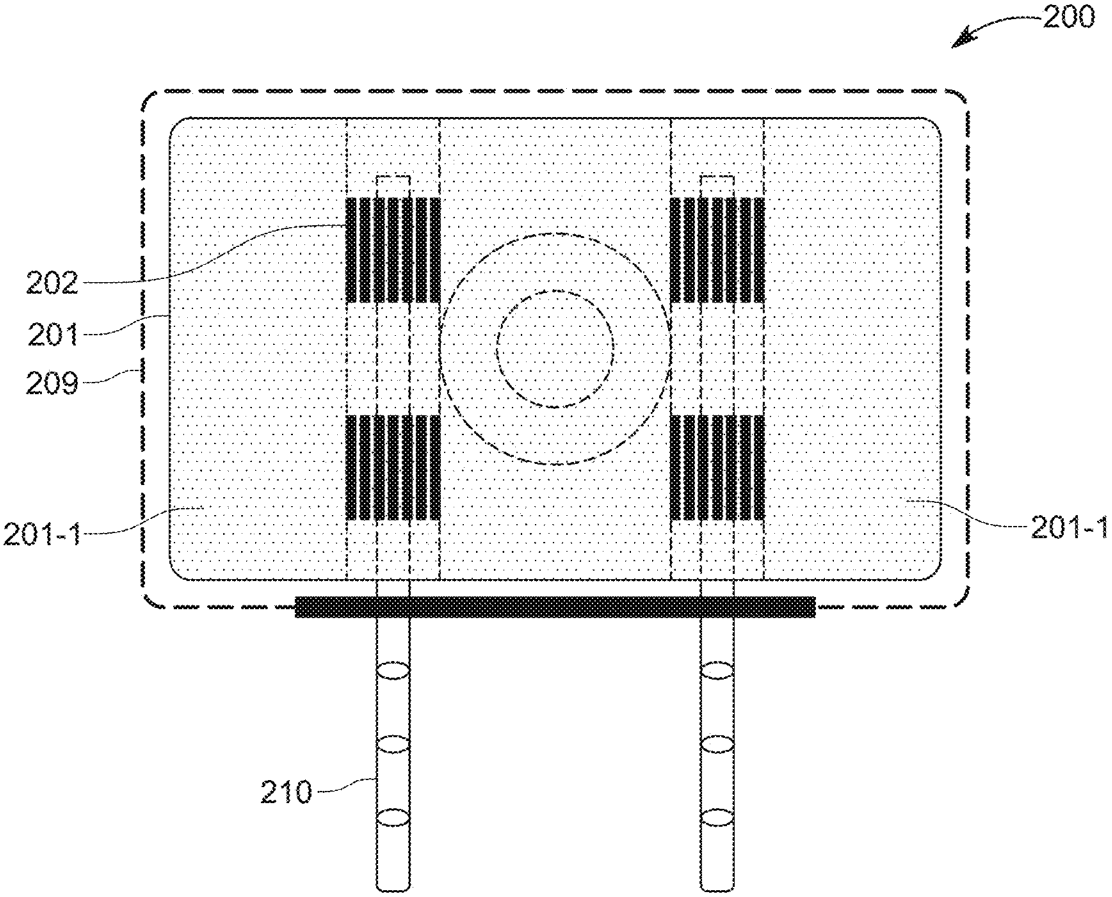
FIGS. 22A to 22E illustrate a second set of examples implementing the teaching of this disclosure.
Figure 22B:
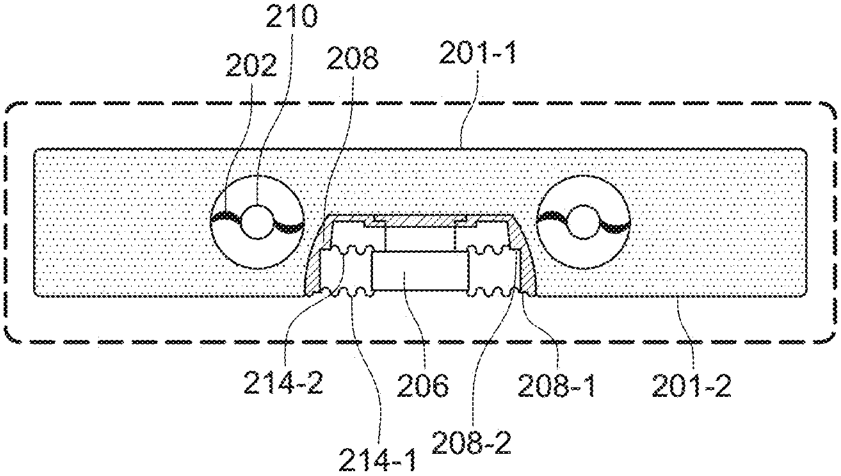

FIGS. 22A-22B show a first example loudspeaker 200 from the second set of examples.

Figure 22C:
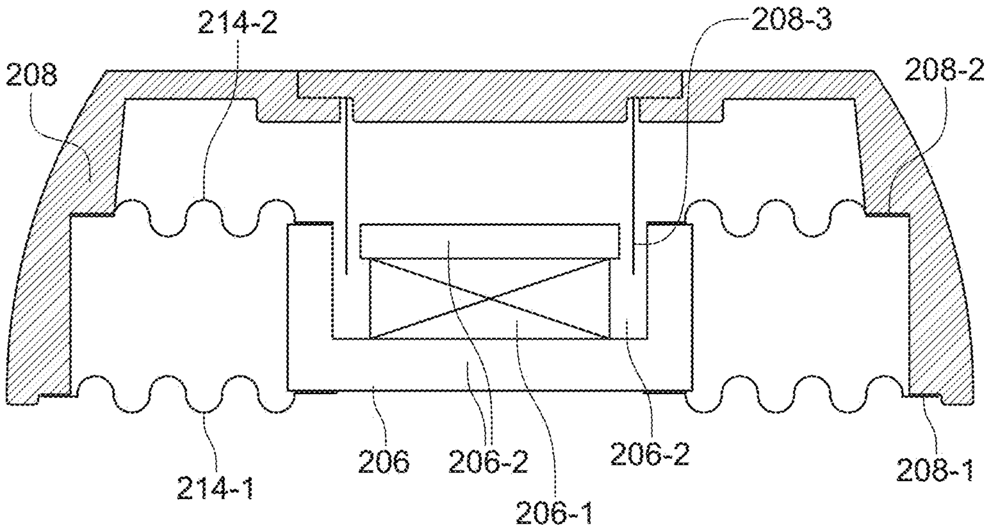

FIG. 22C shows an electromagnetic drive unit of the loudspeaker 200.

As shown in FIGS. 22A-22B, the loudspeaker 200 has a diaphragm 201 having a first radiating surface 201-1 ("front face", which faces towards a passenger seated in a seat that incorporates the headrest) and a second radiating surface 201-2 ("back face", which faces away from a passenger seated in a seat that incorporates the headrest). In this example, the diaphragm 201 is of extruded polystyrene foam or similar, and may optionally be reinforced with a surface skin (not shown).

The diaphragm 201 is suspended from mounting legs 210 via suspension elements 202. The mounting legs 210, which are themselves part of a car seat frame, act as a frame from which the diaphragm 201 is suspended. In this example, the suspension elements 202 are elastic suspensions having a corrugated profile to facilitate excursion. The electromagnetic drive unit of the loudspeaker 200 includes a magnet unit 206 and a voice coil (not shown).

In this example, the voice coil is attached (e.g. glued) to the diaphragm 201 via a voice coil coupler 208 (described in more detail below).

In this example, the magnet unit 206 is suspended from the diaphragm 201 via two magnet unit suspension elements 214-1, 214-2 and the voice coil coupler 208. In this example, the two magnet unit suspension elements 214-1, 214-2 take the form of spiders which may be made from an impregnated textile (metal springs may be used in other examples). A spider may be understood as a textile ring having circumferentially extending corrugations (which may facilitate movement along the longitudinal axis whilst substantially preventing movement perpendicular to this axis), as is known in the art. The spiders may be made of impregnated textile. The magnet unit 206 includes a permanent magnet 206-1, and magnetic field guiding elements 206-2. The permanent magnet 206-1 and the magnetic field guiding elements 206-2 of the magnet unit 206 are configured to define an airgap 206-2 and to provide a magnetic field having concentrated flux in the air gap 206-2. The voice coil is configured to sit in the airgap 206-2 when the diaphragm 201 is at rest.

In this example, the voice coil coupler 208 takes the form of a housing provided with surfaces 208-1, 208-2 configured to allow the two magnet unit suspension elements 214-1, 214-2 to be attached (e.g. glued) to the voice coil coupler 208. In this example, the housing of the voice coil coupler 208 also includes a cylindrical guiding surface 208-3 onto which the voice coil may be mounted (e.g. glued) in place, though the voice coil is not shown in FIG. 22.

When a current is passed through the voice coil, it will produces a magnetic field which interacts with the magnetic field produced by the magnet unit 206 which will cause the diaphragm to move relative to the magnet unit 206, with this movement being accommodated by the magnet unit suspension elements 214-1, 214-2.

As noted above, the voice coil coupler 208 could be made of plastic, e.g. ABS, PC, or PVC, and may be filled with (e.g. 20%) glass fibres to improve structural strength. The voice coil coupler 208 could also be perforated to facilitate gluing and/or to allow visual inspection of the amount and curing of glue used. The size of the voice coil coupler 208 could be extended as needed for crash impact protection.

The loudspeaker 200 also includes an acoustically transparent shell 209 or headrest framework suitable to be covered with an acoustically transparent finishing material.

Figure 22D:
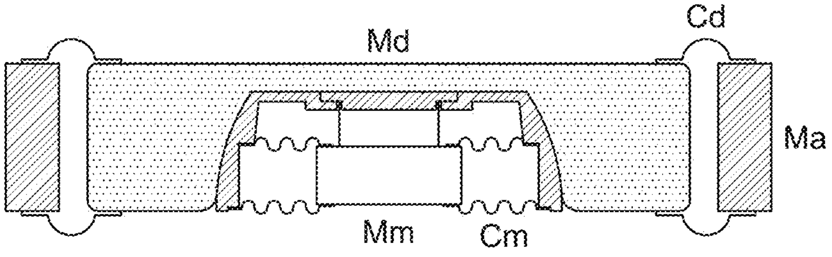
Figure 22E:
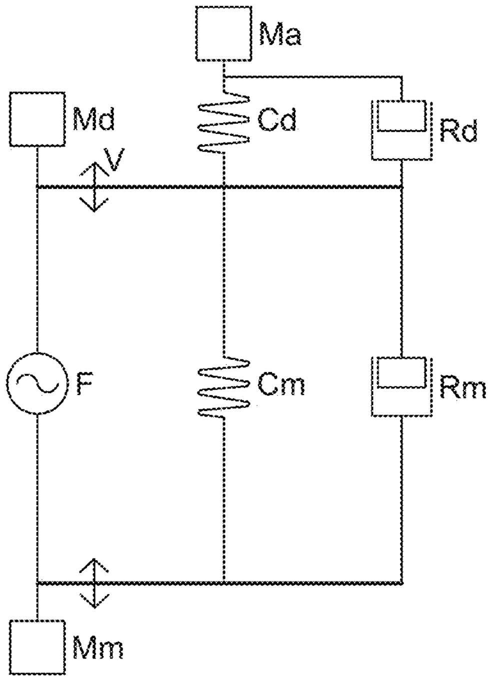

FIGS. 22D-22E show masses and compliances presented in a mechanical analogy of the loudspeaker 200.

In FIGS. 22D-22E, the following notation is used:

Md: mass of diaphragm 201

Mm: mass of magnet unit 206

Ma: mass of the "application" (=mass of mounting legs 210, and the structure to which the mounting legs 210 is rigidly attached, which in this case is the rest of the car set via the car seat frame)

Cd: compliance of the primary suspension elements 202

Cm: compliance of secondary suspension elements 214

Rd: mechanical friction (losses) of Cd

Ra: mechanical friction (losses) of Ca

Example mass/compliance distribution of the loudspeaker 100:

| | |
|---|---|
| Md: 82 g (including airload) | Cm: 0.25 mm/N |
| Mm: 420 g | Re: 7.2 ohm |
| Ma: 1 kg (arbitrary) | Sd: 540 $cm^2$ |
| Cd: 1.5 mm/N | Bl: 9N/A |

Figure 23:
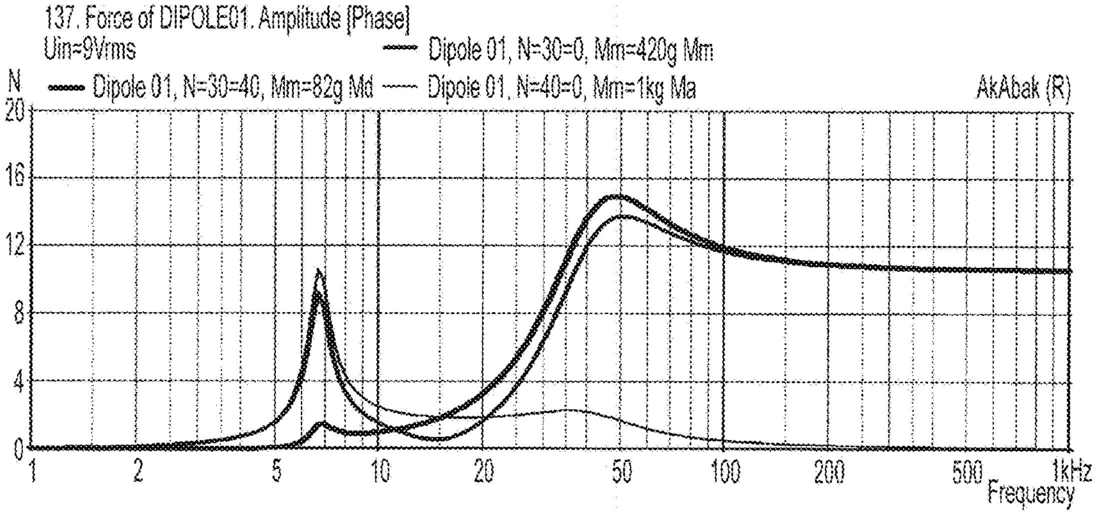
FIGS. 23A to 23B illustrate a second set of examples implementing the teaching of this disclosure.
Figure 23:
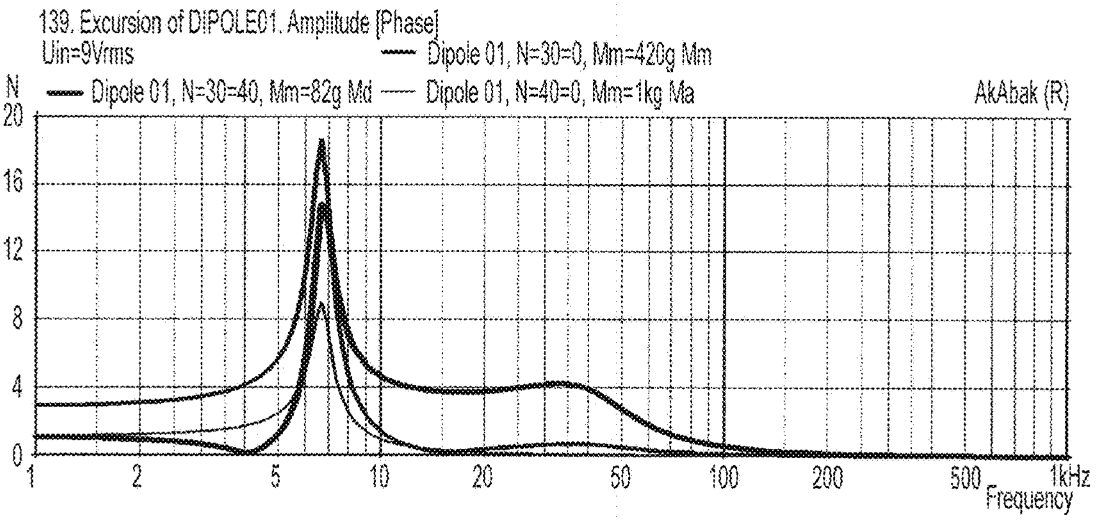

FIG. 23A shows the force profile for the loudspeaker 200 shown in FIGS. 22A-22E, where the thick curve shows peak force acting on Md (diaphragm), the medium curve shows peak force acting on Mm (magnet unit), and the thin curve shows peak force acting on Ma (application).

In this example, there is considerably more force acting on the application, than for the first loudspeaker 100 of the first set of examples, as illustrated previously. However, the force on the application (thin curve) is still heavily reduced compared to where no measures are taken, and the force on the application is less than the force on the magnet unit (medium curve) and the diaphragm (thick curve) at bass frequencies over ~20 Hz.

FIG. 23B shows the excursion profile for the loudspeaker 200 shown in FIGS. 22A-22E, where the thick curve shows peak excursion of the diaphragm Md, the medium curve shows the peak excursion of the magnet system Mm, and the thin curve shows peak excursion of the application Ma.

FIG. 23B shows that the excursion of the diaphragm 201 dominates compared with the other elements, which can be viewed as acceptable.

FIGS. 24A-24B show a second example loudspeaker 200*a* from the second set of examples. In this example, the diaphragm is suspended from rigid headrest framework 211*a* which is part of the car seat frame via two suspension elements 202-1*a*, 202-2*a* in the form of a continuous roll suspension. The rigid headrest framework provides a baffle which, because of the continuous roll suspension causes path length D of the loudspeaker 200*a* to increase, e.g. for the purposes of obtaining a larger personal sound cocoon.

Figure 25:
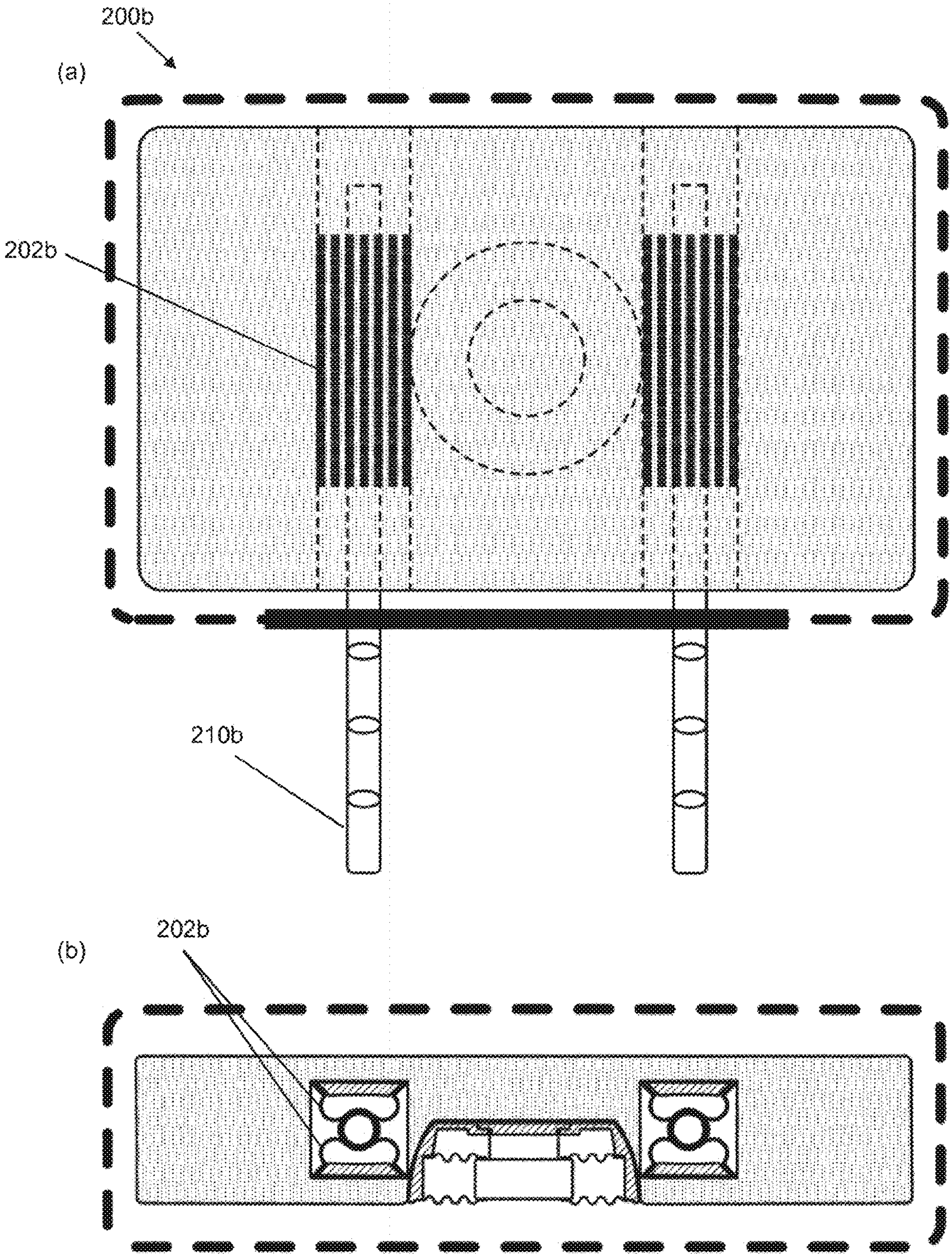
FIGS. 25A to 25B illustrate a second set of examples implementing the teaching of this disclosure.

FIGS. 25A-25B show a third example loudspeaker 200*b* from the second set of examples. In this example, the diaphragm is suspended from mounting legs 210*b* via a plurality of suspension elements 202*b* provided by a combination of four hemispherical roll suspensions which may help to bring more stable movement and excursion possibilities.

Further Examples

Figure 26:
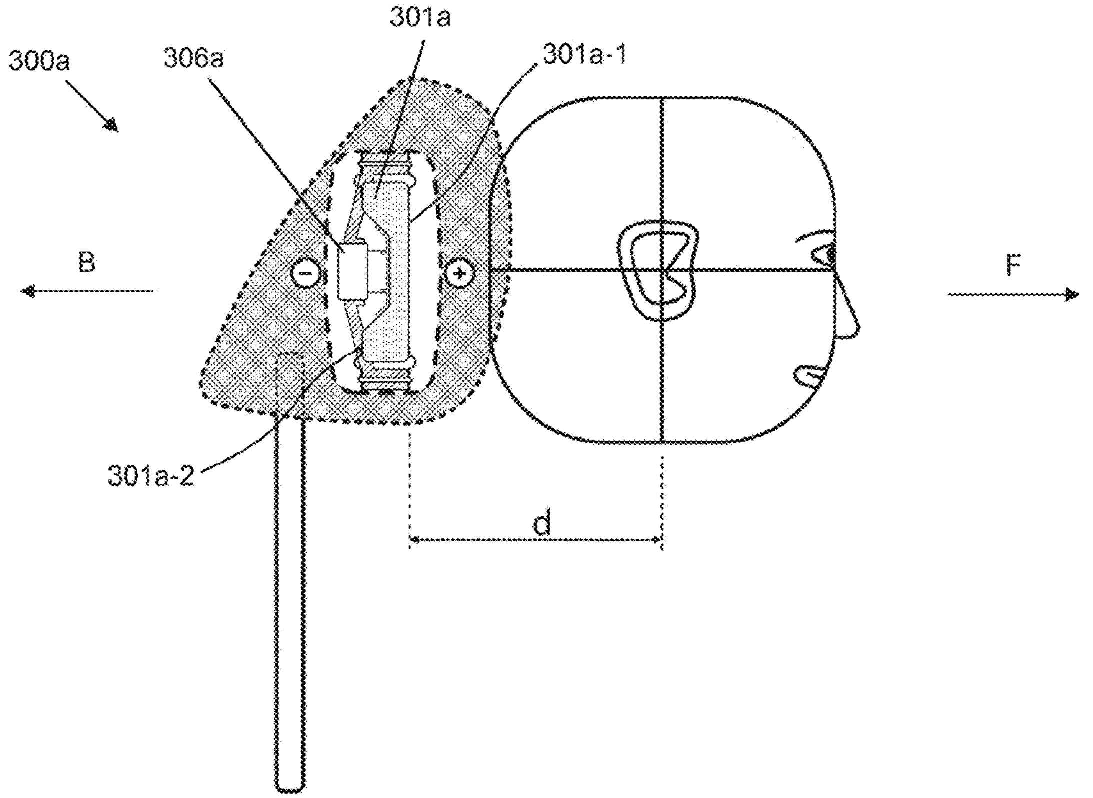
FIGS. 26A to 26B illustrate a further example implementing the teaching of this disclosure.
Figure 26:
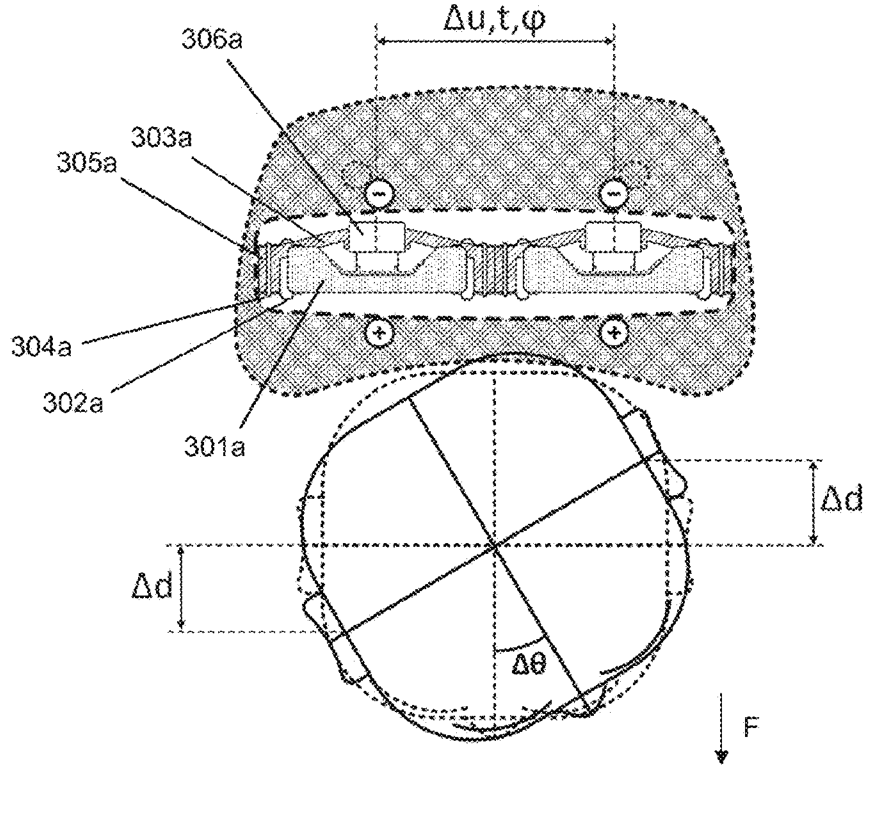

FIGS. 26A-26B show an example loudspeaker 300*a* implemented in a car headrest. The example loudspeaker 300*a* of FIGS. 26A-26B includes an array of two diaphragms 301*a*, each diaphragm 301*a* in the array having a first radiating surface 301*a*-1 and a second radiating surface 301*a*-2, wherein the first radiating surface 301*a*-1 and the second radiating surface 301*a*-2 are located on opposite faces of the diaphragm 301*a*, wherein the first radiating surfaces 301*a*-1 have a combined surface area of at least 100 $cm^2$, and wherein the second radiating surfaces 301*a*-2 have a combined surface area of at least 100 $cm^2$.

The loudspeaker 300*a* includes a plurality of drive units, wherein each drive unit includes a magnet unit 306*a* and is configured to move a respective one of the diaphragms 301*a* in the array at bass frequencies such that the first and second radiating surfaces 301*a*-1, 301*a*-2 of the diaphragm 301*a* produce sound at bass frequencies, wherein the sound produced by the first radiating surfaces 301*a*-1 is in antiphase with sound produced by the second radiating surfaces 301*a*-2.

In this example, each diaphragm 301*a* is suspended from a respective first frame 303*a* via primary suspension elements 302*a*, wherein each first frame 303*a* is suspended from a second frame 305*a* via secondary suspension elements 304*a*. The diaphragms 301*a* are thereby suspended from the second frame 305*a* via the first frames 303*a* and primary suspension elements 302*a*.

The diaphragms 301*a* are suspended from the second frame 305*a* such that the first radiating surface 301*a*-1 of each diaphragm faces in a forwards direction F, and such that a second radiating surface 301*a*-2 faces in the backwards direction B. In this example, the principal radiating axes of the first radiating surfaces 301*a*-1 are parallel to each other but, for avoidance of any doubt, the principal radiating axes of the diaphragms 301*a* need not be parallel to each other in order to be considered as facing in the same direction, and may be arranged e.g. with the principal radiating axes of the first radiating surfaces 301*a*-1 being arranged to converge or diverge.

The loudspeaker 300*a* is configured to be used as shown, with a first ear of a user being located at a first listening position that is in front and is 40 cm or less (more preferably 30 cm or less, more preferably 25 cm or less, more preferably 20 cm or less, more preferably 15 cm or less) from the first radiating surface 301*a*-1 of a first one of the diaphragms 301*a* whilst a second ear of the user is located at a second listening position that is in front and is 40 cm or less (more preferably 30 cm or less, more preferably 25 cm or less, more preferably 20 cm or less, more preferably 15 cm or less) from the first radiating surface 301*a*-1 of a second one of the diaphragms 301*a*.

This may be useful e.g. to provide stereo sound to the different ears of a user or alternatively to compensate for movement of a user's head (as will now be described). Preferably, a seat assembly that includes the car headrest also includes a head tracking unit (not shown) configured to track head movement of a user sat in the seat.

The loudspeaker 300*a* may include drive circuitry configured to provide each drive unit with a respective electrical signal derived from the same audio source such that the sound produced by the second radiating surfaces 301*a*-2 is out of phase with respect to the sound produced by the first radiating surfaces 301*a*-1.

The respective electrical signal may be derived from an audio signal provided by the audio source. The audio source could be any source capable of providing an audio signal. Herein, an audio signal can be understood as a signal containing information representative of sound. An audio signal produced by an audio source may typically be an electrical signal (which could be digital or analogue), but could also take another form, such as an optical signal, for example. For avoidance of any doubt, the audio signal provided by the audio source could include a single channel or multiple channels. For example, the audio signal provided by the audio source could be a stereo audio signal including two channels, with each channel being a respective component of the stereo audio signal (though it is thought the respective stereo channels would need to be similar to get adequate cancellation). Different drive units in the loudspeaker 300*a* may be provided with a respective electrical signal derived from a different channel of an audio signal provided by the audio source, e.g. so as to provide a stereo effect. The drive circuitry may take various forms, as would be appreciated by a skilled person. For example, in a simple example, the drive units could be connected to receive the same electrical signal such that the two diaphragms move in exactly the same way. Preferably, the drive circuitry includes a signal processing unit (not shown), which may be a digital signal processor or "DSP", configured to provide each drive unit with a respective electrical signal derived from an audio signal provided by the audio source. Preferably, the signal processing unit is configured to modify the electrical signals provided to the drive units configured to move the diaphragms based on head movement as tracked by the head tracking unit so as to compensate for movement of the head of a user sat in the seat.

Compensation for head movement may involve adjusting any one or more of amplitude (u), delay (t) and phase (ϕ) of one or more of the electrical signals, according suitable algorithms.

In a simple example, the signal processing unit may be configured to increase the amplitude of sound produced by one of the diaphragms 301*a* if it is determined based on head movement as tracked by the head tracking unit that an ear of the user has moved further away from the first radiating surface 301*a*-1 of that diaphragm 301*a* (e.g. by distance Δd as shown in FIG. 26B). Similarly, the drive circuitry may be configured to decrease the amplitude of sound produced by one of the diaphragms 301*a* if it is determined based on head movement as tracked by the head tracking unit that an ear of the user has moved closer to the first radiating surface of that diaphragm 301*a* (e.g. by distance Δd as shown in FIG. 26B). The amount by which the amplitude of sound is increased/decreased may depend on the distance by which the relevant ear has moved (e.g. distance Δd as shown in FIG. 26B).

Further Discussion

The teachings of the present disclosure can be implemented in a variety of ways, not limited to car seats. In the transport industry, the teachings of the present disclosure can be implemented to create a low frequency personal sound cocoon for every individual passenger in a car, bus or plane with the option to implement active noise cancellation for low frequency rumble typical for these environments. This could bring added value to a listener's experience in various contexts such as in gaming, personal movie, studio work, comfort seats or just to replace uncomfortable headphones.

The presented dipole solution for low frequencies could be combined with high directivity loudspeakers for mid and high frequencies (e.g. cardioid type) so that an important improvement in sound quality and sound cocooning can be realized.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the spirit and scope of the invention.

For the avoidance of any doubt, any theoretical explanations provided herein are provided for the purposes of improving the understanding of a reader. The inventor does not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

[1] https://en.wikipedia.org/wiki/Equal-loudness_contour
[2] http://www.linkwitzlab.com
[3] http://www.linkwitzlab.com/models.htm
[4] "On the sound field of an oscillating disk in a finite open and closed circular baffle" from Tim Mellow and Leo Kärkkäinen, J. Acoust. Soc. Am 118(3), Pt. 1, September 2005, p 1311-1325.
[5] https://www.techopedia.com/definition/31557/head-tracking
[6] http://www.autoguide.com/auto-news/2017/08/two-companies-are-working-on-bringing-in-car-sensing-tech-to-new-cars.html
[7] https://sharpbrains.com/blog/2014/09/02/general-motors-to-adopt-eye-head-tracking-technology-to-reduce-distracted-driving/
[8] http://www.patentlyapple.com/patently-apple/2016/08/apple-wins-patent-for-advanced-3d-eyehead-tracking-system-supporting-apples-3d-camera.html
[9] "Face Recognition and Head Tracking in Embedded Systems", Lenka Ivantysynova and Tobias Scheffer, Optik&Photonik, January 2015, pages 42-45.

Supplementary Explanation of Path Length

This supplementary explanation is provided by the inventor for the purposes of allowing a reader to better understand the concept of path length D, which the inventor notes is a well understood concept in this technical field.

Figure 27A:
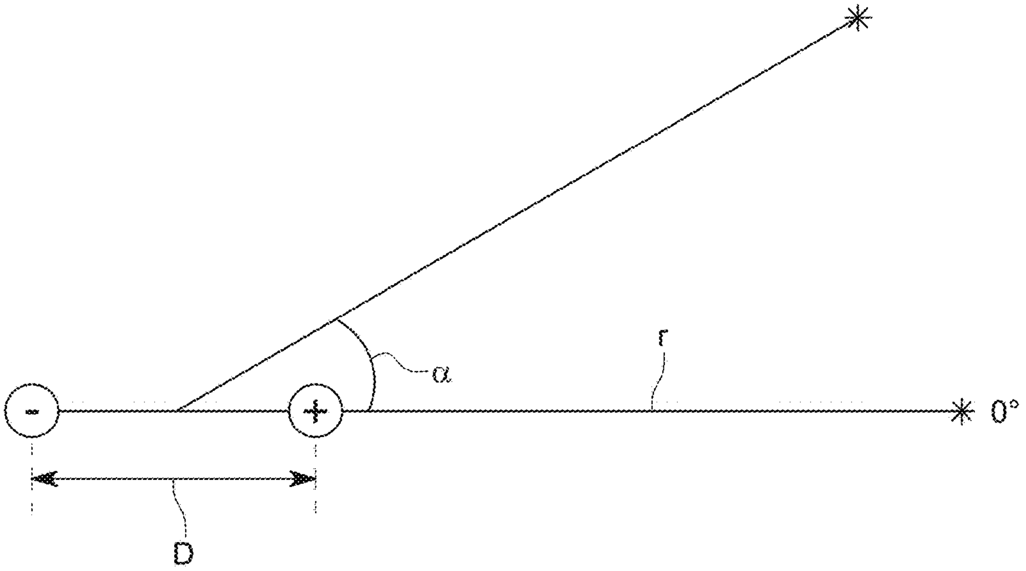
FIGS. 27A to 27C are diagrams referred to in a supplementary explanation of path length.

FIG. 27A shows an ideal dipole loudspeaker, in which two out of phase monopole point sources are radiating into free space (with their principal radiating axes extending in opposite directions) separated by a distance D.

For an ideal dipole loudspeaker as shown in FIG. 27A (which is only achievable in theory), the path length is the distance between the two out of phase monopole point sources, i.e. the distance D as shown in FIG. 27A.

For a real dipole loudspeaker, the path length can be understood as a distance between two out of phase monopole point sources which causes the two point monopole point sources to approximate the behaviour of the real dipole loudspeaker.

A skilled person would know that there are many different ways to calculate path length of a real dipole loudspeaker, either by theory or by simulation.

With reference to FIG. 27A, D can be understood as representing the distance D between the in phase component and the out of phase component of an ideal dipole as observed in front of the dipole at a 0° observation angle (relative to the principal radiating axis of one of the monopole point sources). D can be thought of as being equal to the delay or time interval between the in and out phase component multiplied by the speed of sound.

D will appear shorter when observing at angles greater that 0° so for the purposes of this analysis we will only refer to D at a 0° observation angle, where cos(α)=1.

H(d) can be understood as the sound pressure transfer function for an ideal dipole loudspeaker (two out of phase monopole point sources radiating into free space and separated by a distance D, as described above). H(m) can be understood as the sound pressure transfer function for an equivalent ideal monopole (a single one of the point sources radiating into free space (4 pi)). Sound pressure transfer functions are well understood by skilled persons in the art.

Based on the teaching e.g. of [3], H(d) may be related to H(m) at an adequately large distance as follows:

$$H(d) = 2 \cdot H(m) \cdot \sin\left(\frac{\pi \cdot D}{\lambda} \cdot \cos(\alpha)\right) \tag{1}$$

For an observation angle of zero (α=0, cos(α)=1), and at a frequency $f_{equal}$ at which the sound pressure level of the dipole is equal to that of an equivalent monopole, i.e. at H(d)=H(m), Equation (1) becomes:

$$1 = 2 \cdot \sin\left(\frac{\pi \cdot D}{\lambda_{equal}}\right) \tag{2}$$

where:

$$\lambda_{equal} = \frac{c}{f_{equal}} \tag{3}$$

Where c is the speed of sound (343 m/s), Equation (2) can be rewritten as:

$$\sin\left(\frac{\pi \cdot D}{\lambda_{equal}}\right) = 0.5 \tag{4}$$

which gives:

$$\frac{\pi \cdot D}{\lambda_{equal}} = \frac{\pi}{6} \tag{5}$$

Plugging in Equation (3) to Equation (5) gives:

$$f_{equal} = \frac{c}{6 \cdot D} \tag{6}$$

From the relation for $f_{equal}$ given in Equation (6) above, a path length D for a real dipole loudspeaker having first and second radiating surfaces located on opposite faces of the diaphragm can be obtained by measuring a frequency $f_{equal}$ at which, at observation angle of zero (α=0) in relation to a principal axis of the first radiating surface of the diaphragm, the SPL of the dipole loudspeaker is equal to the SPL of an equivalent monopole loudspeaker in a free field (4 pi) condition. Note that an observation angle of zero (α=0) equates to a position on a principal radiating axis of the first radiating surface of the diaphragm. The theory given above assumes measurements in the far field, but values of $f_{equal}$ tend to be fairly stable with distance (see e.g. FIG. 4) so SPL could in theory be measured at a variety of distances from the first radiating surface for the purpose of measuring $f_{equal}$. For simplicity, we suggest measuring SPL at 1 metre from the first radiating surface of the loudspeaker on the principal radiating axis of the first radiating surface (α=0), since 1 metre is a standard distance for many acoustic measurements. For most of the loudspeakers envisaged herein, measuring SPL at 1 metre from the first radiating surface should allow a value of $f_{equal}$ to be readily obtained. However, for completeness we note where SPL is measured at distances significantly less than 1 metre from the first radiating surface (or where D is very large), the SPL of the dipole loudspeaker may approximate that of a monopole loudspeaker, so the distance from the first radiating surface at which SPL is measured for the purposes of measuring $f_{equal}$ may be increased in such cases, e.g. to 5 metres from the first radiating surface.

In practice, an equivalent monopole loudspeaker (a monopole loudspeaker equivalent to a dipole loudspeaker) may be obtained by mounting the dipole loudspeaker so that the second radiating surface is enclosed, preferably in an enclosure which extends in the direction of the second principal radiating axis and which preferably has a shape which corresponds to that of the outer contours of the second radiating surface (e.g. as shown in FIG. 1A).

Another discussion of how $f_{equal}$ can be calculated is set out in [3], along with a more detailed discussion of path length.

For simplicity and perhaps a better understanding of the relationship between H(d) with H(m) and D at low frequencies where kD<1 (well suited for the purposes of the present disclosure) and also for an adequately distant observation point, the model according to Equation (1) above, may be simplified to:

$$H(d)=H(m)\cdot k\cdot D\cdot\cos(a) \tag{7}$$

Where k is the wavenumber defined by:

$$k=\frac{\omega}{c}=\frac{2\pi f}{c}=\frac{2\pi}{\lambda} \tag{8}$$

For an observation angle of zero (α=0, cos(α)=1), the simplified model of Equation (7) gives:

$$H(d)=H(m)\cdot k\cdot D=H(m)\cdot\frac{2\pi\cdot D}{\lambda} \tag{9}$$

As would be known to one skilled in the art, to view SPL response on a logarithmic decibel scale, the calculated pressure may be divided by a reference pressure of 20 μPa the logarithm of this value multiplied by 20:

$$SPL[\text{dB}]=20\cdot\log_{10}\left(\frac{p_{rms}}{p_{ref}}\right) \tag{10}$$

where:

$$p_{ref}=20\mu Pa_{rms} \tag{11}$$

For the wide bandwidth model of Equation (1), this gives:

$$SPL(d)=20\cdot\log_{10}\left(\frac{2\cdot H(m)\cdot\sin\left(\frac{\pi\cdot D}{\lambda}\cdot\cos(\alpha)\right)}{p_{ref}}\right) \tag{12}$$

And for the simplified model of Equation (7), this gives:

$$SPL(d)=20\cdot\log_{10}\left(\frac{H(m)\cdot k\cdot D\cdot\cos(\alpha)}{p_{ref}}\right) \tag{13}$$

For the purpose of comparing the wide bandwidth model of Equation (1) with the simplified model of Equation (7), an idealized monopole point source with a constant amplitude of 20 μPa (=0 dB SPL) over the complete frequency range may be considered, giving:

$$H(m)=0\text{ dB}=p_{ref}=20\ \mu\text{Pa}_{rms} \tag{14}$$

Using this 0 dB reference in Equation (12), the SPL for the wide bandwidth dipole loudspeaker model of Equation (1) gives:

$$SPL(d)=20\cdot\log_{10}\left(2\cdot\sin\left(\frac{\pi\cdot D}{\lambda}\cdot\cos(\alpha)\right)\right) \tag{15}$$

Similarly, using the 0 dB reference in Equation (13), the SPL for the simplified dipole loudspeaker model of Equation (7) gives $$SPL(d)=20\cdot\log_{10}(k\cdot D\cdot\cos(\alpha)) \tag{16}$$

Figure 27B:
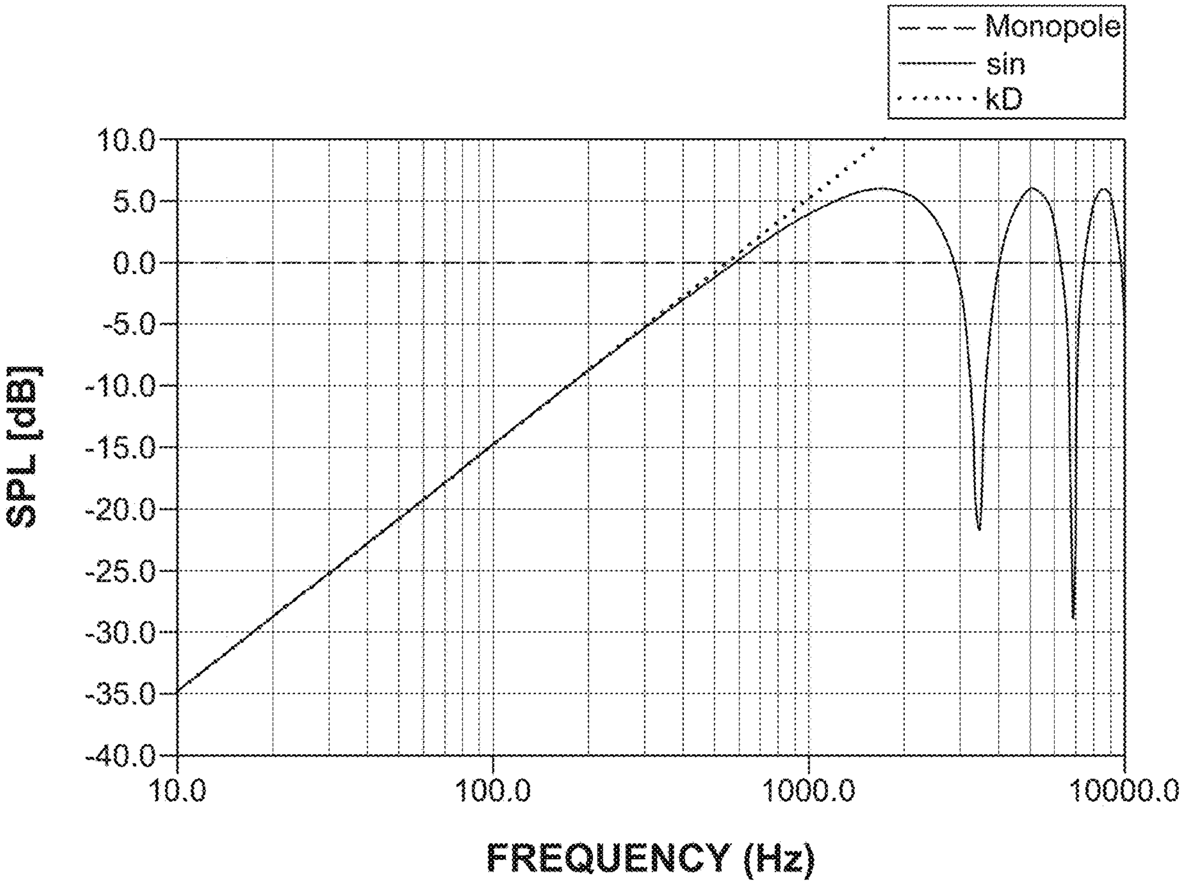

FIG. 27B illustrates SPL for a dipole loudspeaker having a path length D=10 cm at an adequately distant observation point and at an observation angle of zero (α=0, cos(α)=1). In FIG. 26B the SPL is shown for the dipole loudspeaker both according to the wide bandwidth model of Equation (1) (solid line, calculated according to Equation (15)), and according to the simple mode of Equation (7) (dotted line, calculated according to Equation (16)) as compared with a monopole response (dashed line, where SPL is 0 dB since the log of 1 is 0).

FIG. 27B shows that below kD=1, the simple model of Equation (7) corresponds very closely to the wide bandwidth model of Equation (1), hence why the simple model of Equation (7) is described above as being applicable for kD<1.

In both the simple model of Equation (7) and the more sophisticated model of Equation (1) at kD<1, a proportionality of the transfer function of the dipole (H(d)) with frequency (f) and path length (D) can be seen, as depicted in FIG. 27B.

For completeness, we note that the simple model of Equation (7) can be used to arrive at a relation for $f_{equal}$, by again taking $f_{equal}$ as the frequency at which H(d)=H(m). In particular, plugging in frequency $f=f_{equal}$ and H(d)=H(m) into Equation (7) yields:

$$1 = \frac{2\pi \cdot f_{equal} \cdot D}{c} \quad (17)$$

Which in turn gives:

$$f_{equal} = \frac{c}{2\pi \cdot D} \quad (18)$$

Which is a similar result to Equation (6), since 2π≈6.

For a circular disc diaphragm, the path length D is approximately equal to the radius of the diaphragm. If the disc is mounted in a circular baffle or radius b, with no gaps between the diaphragm and the baffle, then the path length D of the dipole loudspeaker would be approximately equal to the radius b added to the thickness of the baffle.

Figure 27C:
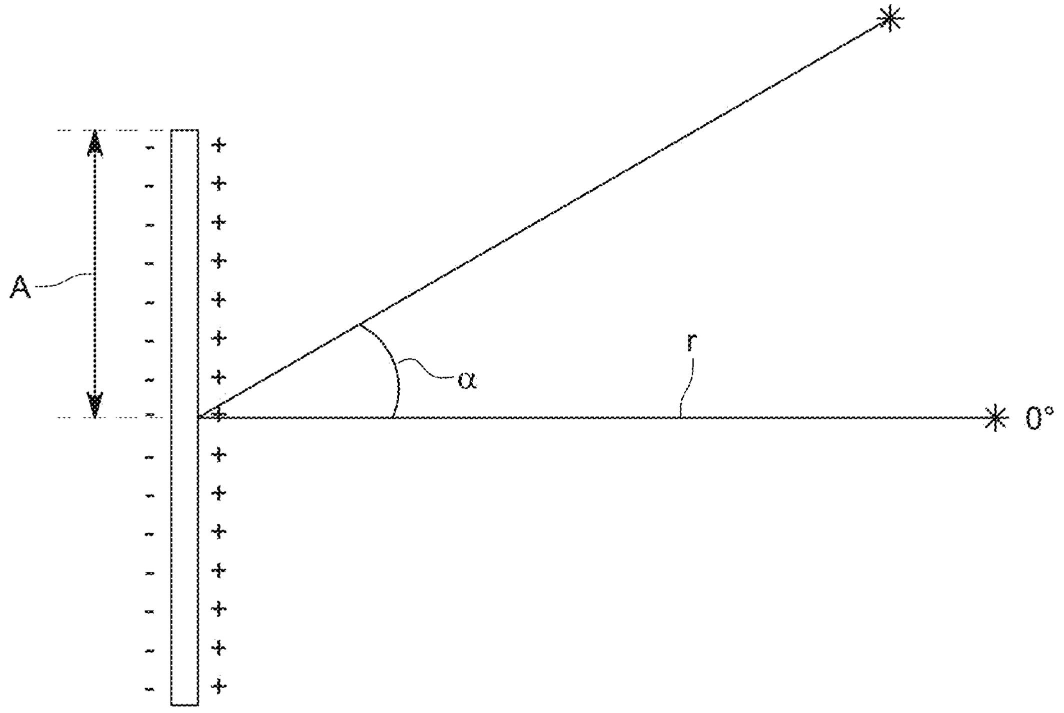

This is illustrated by FIG. 27C, which shows a simplified model of a dipole loudspeaker having a circular diaphragm with radius A, the diaphragm having first and second radiating surfaces producing sound in antiphase. For such a loudspeaker, the path length is approximately equal to A.

In general, adding baffling which increases the distance sound has to travel from one side of the diaphragm before reaching the other side of the diaphragm will increase path length. Similarly, reducing the distance sound has to travel from one side of the diaphragm before reaching the other side of the diaphragm, e.g. by adding a hole to the diaphragm will reduce path length.

The size of the path length will influence the size of the personal sound cocoon created by a loudspeaker made according to the teaching of this document. In general, a larger path length will increase the size of the personal sound cocoon and a small path length will decrease the size of the personal sound cocoon.

A skilled person would appreciate in view of the above discussion that path length can be measured/calculated/simulated in a variety of different ways.

The following clauses, which form part of the description, provide general expressions of the disclosure herein:

A1. A dipole loudspeaker for producing sound at bass frequencies, the dipole loudspeaker including:

- a diaphragm having a first radiating surface and a second radiating surface, wherein the first radiating surface and the second radiating surface are located on opposite faces of the diaphragm, and wherein the first and second radiating surfaces each have a surface area of at least 100 $cm^2$;
- a drive unit configured to move the diaphragm at bass frequencies such that the first and second radiating surfaces produce sound at bass frequencies, wherein the sound produced by the first radiating surface is in antiphase with sound produced by the second radiating surface;
- a frame, wherein the diaphragm is suspended from the frame via one or more suspension elements, wherein the frame is configured to allow sound produced by the first radiating surface to propagate out from a first side of the dipole loudspeaker and to allow sound produced by the second radiating surface to propagate out from a second side of the dipole loudspeaker;

wherein the loudspeaker is for use with an ear of a user being located at a listening position that is in front of the first radiating surface and is 40 cm or less from the first radiating surface.

A2. A dipole loudspeaker according to clause A1, wherein the dipole loudspeaker may be configured such that the SPL of sound produced by the loudspeaker at a bass frequency of 60 Hz as measured at 80 cm from the first radiating surface along a principal radiating axis of the first radiating surface is at least 20 dB lower than the SPL of the same sound as measured at 10 cm from the first radiating surface along the principal radiating axis of the first radiating surface in a free field condition.

A3. A dipole loudspeaker according to any previous clause, wherein the dipole loudspeaker has a path length D that is 25 cm or less, wherein path length D is defined by the equation $$D = \frac{c}{6 \cdot f_{equal}},$$

where c is the speed of sound (343 m/s), and where $f_{equal}$ is a frequency at which the sound pressure of the dipole is equal to the sound of an equivalent monopole in a free field condition as measured at a location on the principal radiating axis of the first radiating surface.

A4. A dipole loudspeaker according to any previous clause, wherein the dipole loudspeaker is a subwoofer and the drive unit is configured to move the diaphragm at frequencies that do not exceed 250 Hz.

A5. A dipole loudspeaker according to any previous clause, wherein the first and second radiating surfaces each have a surface area of at least 250 $cm^2$.

A6. A dipole loudspeaker according to any previous clause, wherein the frame from which the diaphragm is suspended is a first frame, wherein the diaphragm is suspended from the first frame via one or more primary suspension elements, and wherein the first frame is suspended from a second frame via one or more secondary suspension elements.

A7. A dipole loudspeaker according to clause A6, wherein the first frame may includes one or more rigid supporting elements configured to hold a magnet unit of the drive unit in front of the second radiating surface of the diaphragm.

A8. A dipole loudspeaker according to clause A7, wherein the diaphragm includes one or more cut-outs in the second radiating surface, wherein each cut-out is configured to have a respective rigid supporting element extend through it when the loudspeaker is in use.

A9. A dipole loudspeaker according to any one of clauses A6-A8, wherein the second frame is part of, or is configured to fixedly attach to, a rigid supporting structure.

A10. A dipole loudspeaker according to any one of clauses A1-A5, wherein the frame from which the diaphragm is suspended is part of or configured to fixedly attach to, a rigid supporting structure.

A11. A dipole loudspeaker according to clause A10, wherein the magnet unit is suspended from the diaphragm via one or more magnet unit suspension elements.

A12. A dipole loudspeaker according to any previous clause, wherein the frame from which the diaphragm is suspended includes one or more mounting legs which extend into one or more cavities in the diaphragm, wherein the diaphragm is suspended from the one or more mounting legs via one or more suspension elements.

A13. A dipole loudspeaker according to any previous clause, wherein the drive unit is configured to drive the diaphragm so that the first radiating surface produces sound configured to cancel environmental sound as detected by one or more microphones.

A14. A dipole loudspeaker for producing sound at bass frequencies, the dipole loudspeaker including:

an array of two or more diaphragms, each diaphragm in the array having a first radiating surface and a second radiating surface, wherein the first radiating surface and the second radiating surface are located on opposite faces of the diaphragm, wherein the first radiating surfaces have a combined surface area of at least 100 $cm^2$, and wherein the second radiating surfaces have a combined surface area of at least 100 $cm^2$;

a plurality of drive units, wherein each drive unit is configured to move a respective one of the diaphragms in the array at bass frequencies such that the first and second radiating surfaces of the diaphragm produce sound at bass frequencies, wherein the sound produced by the first radiating surfaces is in antiphase with sound produced by the second radiating surfaces;

a frame, wherein each diaphragm in the array is suspended from the frame via one or more suspension elements, wherein the frame is configured to allow sound produced by the first radiating surfaces to propagate out from a first side of the dipole loudspeaker and to allow sound produced by the second radiating surfaces to propagate out from a second side of the dipole loudspeaker.

A15. A seat assembly including a seat and a loudspeaker according to any of the previous clauses.

A16. A seat assembly according to clause A14, wherein the seat is configured to position a user who is sat down in the seat such that an ear of the user is located at a listening position that is 30 cm or less from the first radiating surface of the loudspeaker.

A17. A seat assembly according to clause A14 or A15, wherein the loudspeaker is mounted within a headrest of the seat.

A18. A vehicle having a plurality of seat assemblies according to any one of clauses A14 to A16.

The invention claimed is:

1. A seat assembly including:

a seat including a headrest;

a dipole loudspeaker for producing sound at bass frequencies, wherein the dipole loudspeaker is a subwoofer and is mounted within a headrest of the seat and the dipole loudspeaker includes:

a diaphragm having a first radiating surface and a second radiating surface, wherein the first radiating surface and the second radiating surface are located on opposite faces of the diaphragm, and wherein the first and second radiating surfaces each have a surface area of at least 100 $cm^2$;

a drive unit configured to move the diaphragm at bass frequencies such that the first and second radiating surfaces produce sound at bass frequencies, wherein the sound produced by the first radiating surface is in antiphase with sound produced by the second radiating surface;

a frame, wherein the diaphragm is suspended from the frame via one or more suspension elements, wherein the frame is configured to allow sound produced by the first radiating surface to propagate out from a first side of the dipole loudspeaker and to allow sound produced by the second radiating surface to propagate out from a second side of the dipole loudspeaker;

wherein the drive unit is configured to drive the diaphragm so that the first radiating surface produces sound configured to cancel environmental sound as detected by one or more microphones;

wherein the dipole loudspeaker is configured to be used with an ear of a user being located at a listening position that is in front of the first radiating surface and is 40 cm or less from the first radiating surface.

2. A seat assembly according to claim 1, wherein the dipole loudspeaker is configured such that the SPL of sound produced by the loudspeaker at a bass frequency of 60 Hz as measured at 80 cm from the first radiating surface along a principal radiating axis of the first radiating surface is at least 20 dB lower than the SPL of the same sound as measured at 10 cm from the first radiating surface along the principal radiating axis of the first radiating surface in a free field condition.

3. A seat assembly according to claim 1, wherein the dipole loudspeaker has a path length D that is 25 cm or less, wherein path length D is defined by the equation $$D = \frac{c}{6 \cdot f_{equal}},$$

where c is the speed of sound (343 m/s), and where $f_{equal}$ is a frequency at which the sound pressure of the dipole is equal to the sound of an equivalent monopole in a free field condition as measured at a location on the principal radiating axis of the first radiating surface.

4. A seat assembly according to claim 1, wherein the drive unit is configured to move the diaphragm at bass frequencies including frequencies in the range 40-100 Hz.

5. A seat assembly according to claim 1, wherein drive unit is configured to move the diaphragm at frequencies that do not exceed 250 Hz.

6. A seat assembly according to claim 1, wherein the first and second radiating surfaces each have a surface area of at least 250 $cm^2$.

7. A seat assembly according to claim 1, wherein the frame from which the diaphragm is suspended is a first frame, wherein the diaphragm is suspended from the first frame via one or more primary suspension elements, and wherein the first frame is suspended from a second frame via one or more secondary suspension elements.

8. A seat assembly according to claim 7, wherein the first frame may includes one or more rigid supporting elements configured to hold a magnet unit of the drive unit in front of the second radiating surface of the diaphragm.

9. A seat assembly according to claim 8, wherein the diaphragm includes one or more cut-outs in the second radiating surface, wherein each cut-out is configured to have a respective rigid supporting element extend through it when the loudspeaker is in use.

10. A seat assembly according to claim 7, wherein the second frame is part of, or is configured to fixedly attach to, a rigid supporting structure.

11. A seat assembly according to claim 10, wherein the rigid supporting structure includes a frame of the car seat.

12. A seat assembly according to claim 1, wherein the frame from which the diaphragm is suspended is part of or configured to fixedly attach to, a rigid supporting structure.

13. A dipole loudspeaker according to claim 12, wherein the rigid supporting structure includes a frame of the car seat.

14. A seat assembly according to claim 12, wherein the magnet unit is suspended from the diaphragm via one or more magnet unit suspension elements.

15. A seat assembly according to any claim 1, wherein the frame from which the diaphragm is suspended includes one or more mounting legs which extend into one or more cavities in the diaphragm, wherein the diaphragm is suspended from the one or more mounting legs via one or more suspension elements.

16. A seat assembly according to claim 1, wherein the seat assembly includes the one or more microphones.

17. A seat assembly including:

a seat including a headrest;

a dipole loudspeaker for producing sound at bass frequencies, wherein the dipole loudspeaker is a subwoofer and is mounted within a headrest of the seat and the dipole loudspeaker includes:

an array of two or more diaphragms, each diaphragm in the array having a first radiating surface and a second radiating surface, wherein the first radiating surface and the second radiating surface are located on opposite faces of the diaphragm, wherein the first radiating surfaces have a combined surface area of at least 100 $cm^2$, and wherein the second radiating surfaces have a combined surface area of at least 100 $cm^2$;

a plurality of drive units, wherein each drive unit is configured to move a respective one of the diaphragms in the array at bass frequencies such that the first and second radiating surfaces of the diaphragm produce sound at bass frequencies, wherein the sound produced by the first radiating surfaces is in antiphase with sound produced by the second radiating surfaces;

a frame, wherein each diaphragm in the array is suspended from the frame via one or more suspension elements, wherein the frame is configured to allow sound produced by the first radiating surfaces to propagate out from a first side of the dipole loudspeaker and to allow sound produced by the second radiating surfaces to propagate out from a second side of the dipole loudspeaker wherein the drive unit is configured to drive the diaphragm so that the first radiating surface produces sound configured to cancel environmental sound as detected by one or more microphones;

wherein the dipole loudspeaker is configured to be used with a first ear of a user being located at a first listening position that is in front and is 40 cm or less from the first radiating surface of a first one of the diaphragms while a second ear of the user is located at a second listening position that is in front and is 40 cm or less from the first radiating surface of a second one of the diaphragms.

18. A seat assembly according to claim 17, wherein the drive unit is configured to move the diaphragm at bass frequencies including frequencies in the range 40-100 Hz.

* * * * *